(12) United States Patent
Bala et al.

(10) Patent No.: US 7,013,312 B2
(45) Date of Patent: Mar. 14, 2006

(54) WEB-BASED STRATEGIC CLIENT PLANNING SYSTEM FOR END-USER CREATION OF QUERIES, REPORTS AND DATABASE UPDATES

(75) Inventors: Catherine G. Bala, La Grangeville, NY (US); Thomas A. Jobson, Jr., New Paltz, NY (US); F. Jay Kolb, Red Hook, NY (US); Brian L. Merzbach, Wappingers Falls, NY (US); Christine L. Quintero, Poughkeepsie, NY (US); Scott Selvia, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 09/886,547

(22) Filed: Jun. 21, 2001

(65) Prior Publication Data

US 2003/0018644 A1    Jan. 23, 2003

(51) Int. Cl.
    G06F 17/30    (2006.01)
(52) U.S. Cl. .................. 707/200; 707/103 R
(58) Field of Classification Search .............. 707/2, 707/3, 4, 5, 10, 101, 103 R, 200, 103, 201, 707/1; 705/7, 26; 709/223, 226, 203; 345/762
See application file for complete search history.

(56) References Cited

U.S. PATENT DOCUMENTS

| | | | |
|---|---|---|---|
| 4,751,635 A | 6/1988 | Kret ............................ | 707/10 |
| 5,230,073 A | 7/1993 | Gausmann et al. ............ | 707/3 |
| 5,740,423 A | 4/1998 | Logan et al. ................. | 707/10 |
| 5,796,999 A | 8/1998 | Azagury et al. .............. | 707/10 |
| 5,802,514 A * | 9/1998 | Huber .......................... | 707/4 |
| 5,826,261 A | 10/1998 | Spencer ........................ | 707/5 |
| 5,842,196 A | 11/1998 | Agarwal et al. ............... | 707/2 |
| 5,859,978 A | 1/1999 | Sonderegger et al. ....... | 709/226 |
| 5,920,856 A | 7/1999 | Syeda-Mahmood ........... | 707/3 |
| 5,926,808 A | 7/1999 | Evans et al. ................... | 707/3 |
| 5,950,190 A * | 9/1999 | Yeager et al. ................. | 707/3 |
| 5,970,472 A | 10/1999 | Allsop et al. ................. | 705/26 |
| 5,974,416 A | 10/1999 | Anand et al. ................. | 707/10 |
| 5,999,926 A | 12/1999 | Suciu ............................ | 707/5 |
| 6,078,866 A | 6/2000 | Buck et al. .................... | 702/2 |
| 6,088,692 A | 7/2000 | Driscoll ........................ | 707/5 |
| 6,115,719 A | 9/2000 | Purdy et al. ............ | 707/103 R |
| 6,125,351 A | 9/2000 | Kauffman ..................... | 705/7 |
| 6,266,666 B1 * | 7/2001 | Ireland et al. ................ | 707/10 |
| 6,295,540 B1 * | 9/2001 | Sanschagrin et al. ....... | 707/201 |
| 6,567,915 B1 * | 5/2003 | Guthery ...................... | 713/168 |
| 6,714,962 B1 * | 3/2004 | Helland et al. ............. | 709/203 |
| 2002/0152293 A1 * | 10/2002 | Hahn et al. ................. | 709/223 |
| 2002/0167543 A1 * | 11/2002 | Smith et al. ................ | 345/762 |
| 2003/0023609 A1 * | 1/2003 | Della-Libera et al. ...... | 707/101 |

* cited by examiner

*Primary Examiner*—Mohammad Ali
*Assistant Examiner*—Ettienne P LeRoux
(74) *Attorney, Agent, or Firm*—Gibb I.P. Law Firm, LLC; Jay H. Anderson, Esq.

(57) ABSTRACT

A method and program storage device for creating tabular data stream flow for sending rows of secure data between a client workstation and a server computer over a network using a common object request broker architecture (CORBA). This method includes receiving a request to create a query form at the client workstation, receiving a worksheet grid form defining selected tabular data, and packaging the worksheet grid form representing an updated status of the data for the tabular data stream flow.

11 Claims, 20 Drawing Sheets

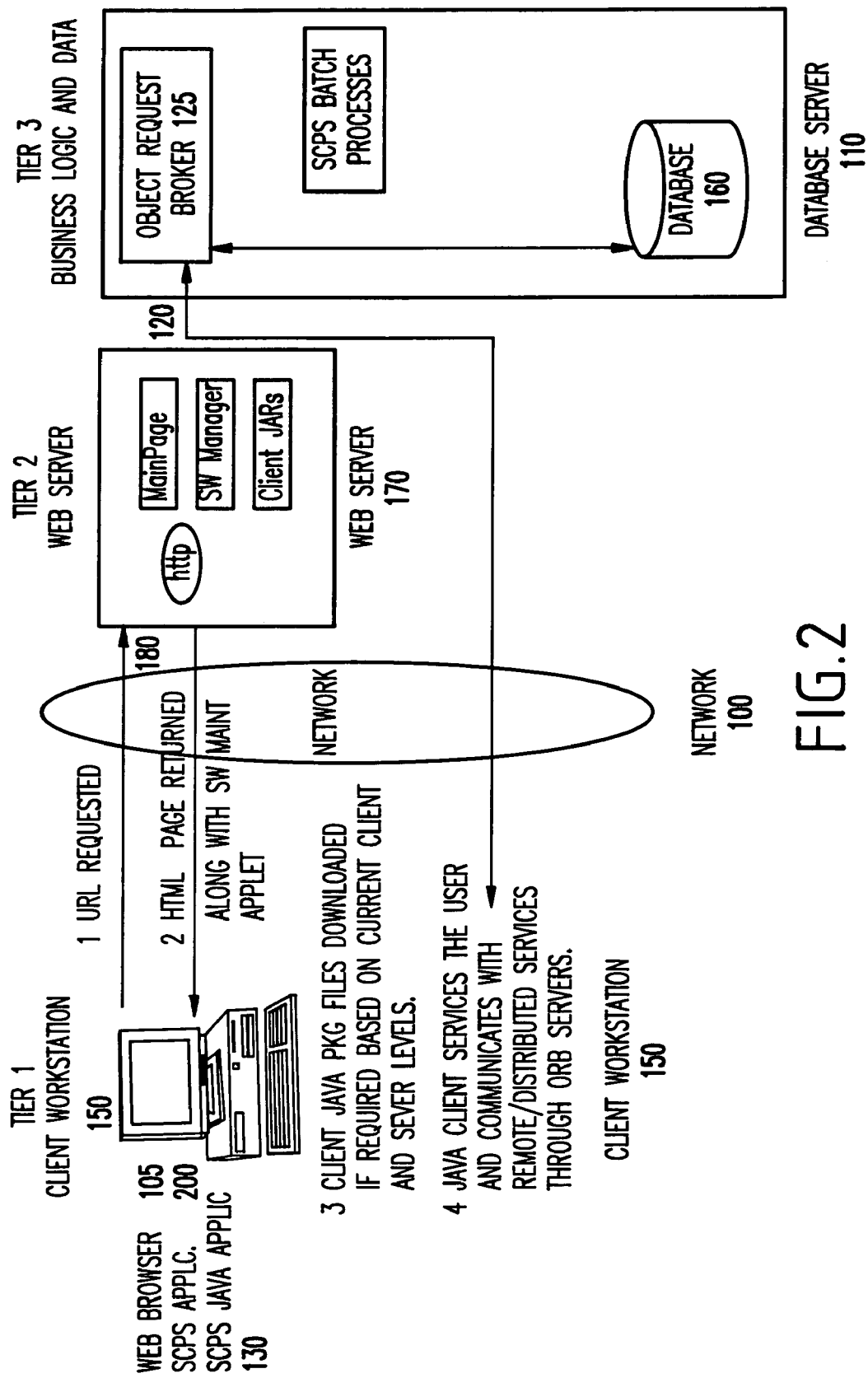

| Table Description | Outer Name | Extended Relationship | Relationship Name | Table Schema | Table Name |
|---|---|---|---|---|---|
| User Security Control | | | CONUSRID | EPPS | USER_SECUR |
| CHANNEL | | | CONCHAN | WISARD | CHANNEL |
| ITEM_GEO_MASTER | | Y | CONIGM | WISARD | ITEM_GEO_MASTER |
| ITEM_MASTER | | Y | R0001 | WISARDV | ITEM_MASTER |
| EXT_PROJ_NAME_WORK | | | R0171 | WISARDV | EXT_PROJ_NAME_WORK |
| PLANNING_ITEM_WORK | | | R0170 | WISARDV | PLANNING_ITEM_WORK |

SCPS WorkSheet Definition – CGBALA ON WISDVLT (ETISN57) – New WorkSheet Definition

File  Help

[Save] [Save As] [Print] [Run] [Exit] [Help Topics]    ☐ Read Only

Datasource: [WISDVLT]   Name: [MYSAMPLE]   Description: [Sample Updatable Worksheet]   — 330

| Primary | Comparison | Relationships | Columns | Groups | Sort | Totals | Constraints | SQL | Preferences |

Select Sort Order Columns:

| | Order | Key | Column Description | Column Name | Short Description |
|---|---|---|---|---|---|
| 1 | 1 | Y | PLANNING_ITEM | PLANNING_ITEM | PLANNING_ITEM |
| 2 | | N | MFG_LOC | MFG_LOC | MFG_LOC |
| 3 | 2 | Y | GEOGRAPHY | GEOGRAPHY | GEOGRAPHY |
| 4 | 3 | Y | SUB_GEOGRAPHY | SUB_GEOGRAPHY | SUB_GEOGRAPHY |
| 5 | 4 | Y | CHANNEL | CHANNEL | CHANNEL |
| 6 | 5 | Y | SUB_CHANNEL | SUB_CHANNEL | SUB_CHANNEL |
| 7 | | N | FCST_ID | FCST_ID | FCST_ID |
| 8 | | N | Q1_2001 – SQL Computed Column | Y1Q01 | Q1_2001 |
| 9 | | N | Jan 2001 – Y1M01 | Y1M01 | Jan_2001 |
| 10 | | N | Feb 2001 – Y1M02 | Y1M02 | Feb_2001 |
| 11 | | N | March 2001 – Y1M03 | Y1M03 | March_2001 |
| 12 | | N | DESCRIPTION | DESCRIPTION | DESCRIPTION |

[Select All]  [Deselect All]

Signed by: Unsigned classes from local hard disk

FIG. 3E

| Display Order | Sub-Total | Sub-Total Column | Sort Order | Key | Column Description |
|---|---|---|---|---|---|
| 1 | | | 1 | Y | PLANNING_ITEM |
| 2 | | | | N | MFG_LOC |
| 3 | | | 2 | Y | GEOGRAPHY |
| 4 | | | 3 | Y | SUB_GEOGRAPHY |
| 5 | | | 4 | Y | CHANNEL |
| 6 | | | 5 | Y | SUB_CHANNEL |

Row Grand Totals:
☐ Display Row Grand Totals

Quantities In:
⊙ Unit  ○ Dec  ○ K  ○ M  ○ B

Computed Columns:
⊙ Sum  ○ Average

Datasource: WISDVLT    Name: MYSAMPLE    Description: Sample Updatable Worksheet Primary | Comparison | Relationships | Columns | Groups | Sort | Totals | Constraints | SQL | Preferences Define/Edit: Sub-Totals | Calculated Columns | SQL Computed Columns | Sub-Total Columns SCPS WorkSheet Definition — CGBALA ON WISDVLT (ETISN57) — New Worksheet Definition File  Help Save | Save As | Print | Run | Exit | Help Topics ☐ Read Only

340

Signed by: Unsigned classes from local hard disk

| | SCPS Worksheet Definition - CGBALA ON WISDVLT (ETSN57) - New Worksheet Definition | _ □ ☒ |
|---|---|---|
| File Help | | |

| Save | Save As | Print | Run | Exit | Help Topics | | ☐ Read Only |
|---|---|---|---|---|---|---|---|

Datasource: WISDVLT    Name: COMPARE    Description: Sample Comparison Worksheet

| Primary | Comparison | Relationships | Columns | Groups | Sort | Totals | Constraints | SQL | Preferences |

Type: -All-
Schema: WISARD

| Table Type | Table Description | Table Name |
|---|---|---|
| Table | Project Name Work Table | PROJ_NAME_WORK |
| Table | SCHEDR_SECURITY_ID | SCHEDR_SECURITY_ID |
| Table | SHIPCOM | SHIPCOM |
| Table | SHIPREQ 199811 | SHIPREQ_PREV |
| Table | SHIPREQ | SHIPREQ |

375

| Deselect | | Validate Table |

Comparison Options:
⊙ Compare   ○ Compare with Delta   ○ Delta Only   ○ Significant Delta = [    ] %

◇ Signed by: Unsigned classes from local hard disk

| Row | PLANNING ITEM | MFG LOC | GEO... | FCST ID | Q1 2001 | JAN 2001 | FEB 2001 | MAR 2001 | Description |
|---|---|---|---|---|---|---|---|---|---|
| 1 | 0000001 | RA | AP | 200104 | 2600 | 400 | 700 | 1500 | SAMPLE POWER UNIT |
| 2 | 0000001 | RA | AP | 200104 | 400 | 0 | 100 | 300 | SAMPLE POWER UNIT |
| 3 | 0000001 | RA | AP | 200104 | 0 | 0 | 0 | 0 | SAMPLE POWER UNIT |
| 4 | 0000001 | RA | AP | 200104 | 3700 | 1000 | 1200 | 1500 | SAMPLE POWER UNIT |
| 5 | 0000001 | RA | AP | 200104 | 0 | 0 | 0 | 0 | SAMPLE POWER UNIT |
| 6 | 0000002 | RA | AP | 200106 | 53000 | 17000 | 20000 | 16000 | BASIC PART A |
| 7 | 0000002 | RA | AP | 200106 | 0 | 0 | 0 | 0 | BASIC PART A |
| 8 | 0000002 | RA | AP | 200106 | 12600 | 4300 | 4100 | 4200 | BASIC PART A |
| 9 | 0000002 | RA | AP | 200106 | 0 | 0 | 0 | 0 | BASIC PART A |
| 10 | 0000002 | RA | AP | 200106 | 770 | 170 | 210 | 390 | BASIC PART A |
| 11 | 0000003 | RA | AP | 200106 | 240000 | 80000 | 80000 | 80000 | SAMPLE MEMORY UPGRADE |
| 12 | 0000003 | RA | AP | 200106 | 172000 | 80000 | 12000 | 80000 | SAMPLE MEMORY UPGRADE |
| 13 | 0000003 | RA | AP | 200106 | 210000 | 80000 | 80000 | 50000 | SAMPLE MEMORY UPGRADE |
| 14 | 0000003 | RA | AP | 200106 | 240000 | 80000 | 80000 | 80000 | SAMPLE MEMORY UPGRADE |
| 15 | 0000003 | RA | AP | 200106 | 250000 | 80000 | 90000 | 80000 | SAMPLE MEMORY UPGRADE |

FIG. 4

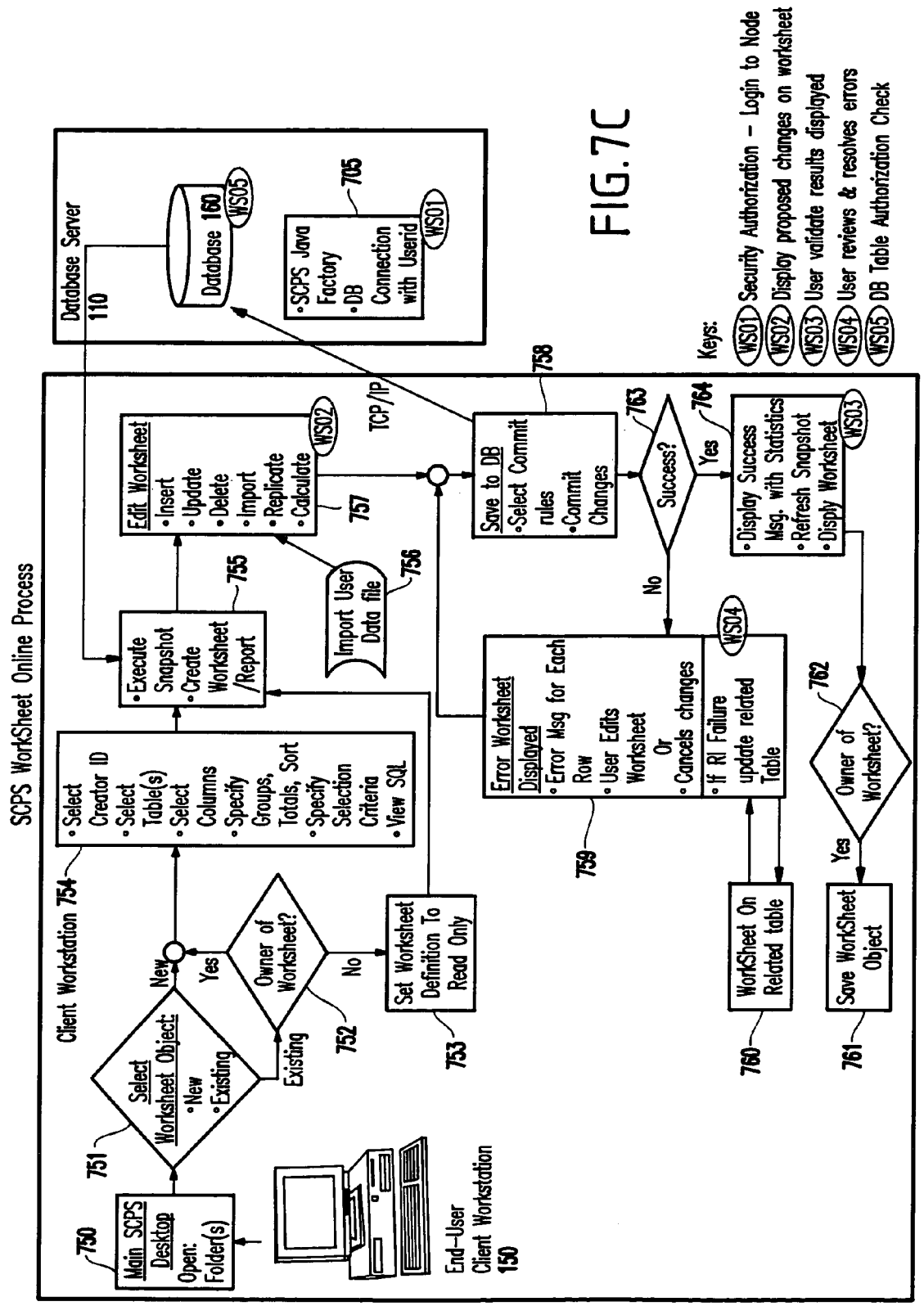

WEB-BASED STRATEGIC CLIENT PLANNING SYSTEM FOR END-USER CREATION OF QUERIES, REPORTS AND DATABASE UPDATES

BACKGROUND OF THE INVENTION

1. Field of the Invention

The present invention generally relates to the field of data transfer and, more particularly, to transferring secure tabular data over a network.

2. Description of the Related Art

Problems faced by manufacturing planners include the need to update large amounts of planning data on database management systems, according to a constantly changing set of criteria (supply, demand, forecasts, parts availability, inventory, etc.) from remote locations of a company. These planners need the ability to create ad hoc queries and reports, customized to their own requirements, and the ability to share these queries and reports with other planners worldwide. They also need to coordinate their updates with the execution of batch processes in their planning cycles. Since the manufacturing planners do not have technical skills to write and maintain complex database queries on a continuous basis, there is need for a user-friendly database access method and system that is secure and has the following functional capabilities.

More specifically, there is a need to create secure complex queries based on selection of table(s), columns, and constraints and, on the queries to create a snapshot of the database data on their workstation. Further, there is a need to edit the results of the query on their workstation, and when all edits are complete, save all the changes on the database. There is a need to retrieve from the database large quantities of data (typically hundreds of thousands of cells, where a cell is defined as an intersection of a row and a column), allowing edits to this data on the workstation, and the ability to commit these changes in total at a time of the planner's choosing. There is also the need to produce reports capable of summarizing database information by selected groups, and producing subtotals and grand totals if desired, as well as reports on the delta between two similarly structured tables. There is also the need to provide the ability to make mass changes (cascade) to a set of related data, across multiple tables. For instance, the planners frequently define new bills of materials (BOMs) with contents similar to an existing BOM. They need the ability to create a new BOM on all tables by copying an existing BOM and changing the BOM name as well as provide an easily administered set of security and controls to ensure users update only the tables, rows, and columns to which they are authorized. Further, there is a need to provide the ability to initiate batch processes on the database server. Prior database access schemes include U.S. Pat. No. 5,974,416 (hereinafter referred to as the '416 patent) entitled "method of creating a tabular data stream for sending rows of data between client and server," which is incorporated by reference. The '416 patent provides a method and tabular data stream format for the transmission of tabular data between a client process running on a client computer and a server process running on a server computer via a computer network such as the Internet.

The tabular data stream format, called the Advanced Data TableGram (ADTG) format, is used for marshaling tabular data in both directions between a Web browser and a Web server. A Web browser query is processed by the Web server retrieving tabular data from a database and converting the data into a rowset. Problems that the '416 patent does not address include ensuring that the client computer and the server computer have knowledge of each other during an entire transaction session that is essential for secure hierarchical integrated processing of data in a business, a mechanism for specifying commit object rules, an ability to display and edit large volumes of data, and an ability to update related information across multiples tables in the database. Thus, there is need for a strategic client planning database access schema for use in a distributed computer network that is easy to use, yet ensures integrity of tabular data used in an organization computing network.

SUMMARY OF THE INVENTION

In view of the foregoing and other problems, disadvantages, and drawbacks of conventional database access methods and systems, the present invention has been devised, and it is an object of the present invention to provide an improved security-based database access method and system in a client-server environment.

To attain the objects suggested above, there is provided, according to one aspect of the invention a computer network having a secure database management system that has a user-friendly database client interface with the following functional capabilities. For example, the invention creates secure complex queries based on selection of table(s), columns, and constraints, and then runs the queries to create a snapshot of the database data on their workstation. Further, the invention edits the results of the query on their workstation, and when all edits are complete, saves the changes on the database. Next the invention produces reports capable of summarizing information by selected groups, and producing subtotals and grand totals if desired. The invention also produces comparison reports on the delta between two similarly structured tables, as well as provides the ability to make mass changes (cascade) to a set of related data, across multiple tables. Further, the invention provides an easily administered set of security and controls to ensure users update only the tables, rows, and columns to which they are authorized as well as provides the ability to initiate batch processes on the database server. Also, the invention provides an automated method of maintaining the current level of software on the client workstation, to ensure that the client level of code is always current.

Thus, one object of the invention is to provide a method of creating tabular data stream flows for sending rows of secure data between a client workstation and a server computer over a network using a common object request broker architecture. This method includes receiving a request to create a query form at the client workstation, receiving a worksheet grid form defining selected tabular data, and packaging the worksheet grid form representing an updated status of the data for the tabular data stream flow.

The SCPS invention is easier for planners to use than conventional database interfaces for the following reasons. The GUI query builder is easy to use and allows a non-technical end-user to create complex queries with advanced database concepts such as joins, grouping, break totals, and sets of constraints linked by and/or relationships. It provides planners with the ability to work with and edit large amounts of data on their workstations, executing "what if" scenarios and modeling forecasts, and allows them to commit the changes back to the database at a time of their own choosing. Most easy-to-use GUI update tools execute the database update immediately after the user moves the cursor position off the current row, which is not desirable in the planning profession. It enables the user to replicate individual rows or blocks of rows in the editable grid, thereby providing the user with a template for creation of sets of data similar to data already existing in the database. Most table editors attempt to execute an insert statement on the database as soon as the row is replicated, thereby causing the insert to fail due to duplicate keys.

The invention provides users with a set of commit rule options which are applied at the time the data is committed to the database. This enables the user to choose the method by which errors are handled during the processing of database updates, deletes, and inserts. For example, the commit rules enable common scenarios such as imports of data to be changed to updates if necessary, without requiring the user to determine if each row in the import already existed in the database.

The invention provides a method of protecting columns from update on the editable grid. It provides a method of defining and administrating database table authorizations. The invention provides the user with information on table relationships without requiring the user to be familiar with the database model. It enables the user to define constraints using the NULL value. It allows the user to search the database for distinct values which occur in a specified column, and to select those values for use in the constraint statement. It enables the user to retrieve a list of items from a file, for use in the constraint statement.

When database error conditions occur due to parent-child relationships, SCPS provides the end user with the ability to identify the relationship and correct the problem by easily opening another editable WorkSheet. It provides the ability to execute mass changes across related tables on the database, using the Cascade function to insert, change, or delete entire sets of related data.

The invention enables users to share their built queries with other users on the same database. It allows users to view the query built by the GUI, and enables them to copy the query for use with other database tools. The invention enables users to work with alias tables and views, as well as real database tables. It allows the user to change the schema of the primary table on an existing WorkSheet definition, without requiring the user to redefine the rest of the query. It provides the ability to define extended parent-child relationships which are outside the scope of the database definition.

The SCPS invention is highly versatile and provides a model for use with any relational database. While the focus of the invention is to provide a set of query-building and data-editing functions for manufacturing planners, it is not unique to the planning environment. The invention can be applied for use with any relational database used by any customer set. It is particularly well adapted to those customer sets who require the ability to work independently with large amounts of data before committing changes to a central database. The invention provides a transparently distributed editor and control tool for remote database systems.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 2 is a block diagram showing a network incorporating the present invention;

FIG. 3B illustrates a graphical user interface (GUI) displayed on a monitor according to the present invention;

FIG. 3D illustrates a graphical user interface (GUI) displayed on a monitor according to the present invention;

FIG. 3E illustrates a graphical user interface (GUI) displayed on a monitor according to the present invention;

FIG. 3I illustrates a graphical user interface (GUI) displayed on a monitor according to the present invention;

FIG. 3J illustrates a graphical user interface (GUI) displayed on a monitor according to the present invention;

FIG. 4 illustrates a graphical user interface (GUI) displayed on a monitor according to the present invention;

FIG. 7C is a diagram showing a computer network environment in which the present invention operates.

DETAILED DESCRIPTION OF PREFERRED EMBODIMENTS OF THE INVENTION

As discussed above, conventional database access systems generally run on the world wide web using a hypertext transport protocol (HTTP) that typically does not provide acceptable performance when used with large volumes of data, and does not ensure data security or knowledge of a client having transactions with a server. The invention provides security in a data access system of a network-based computing system, where a client of a manufacturer can submit updated tables and related technical data of a particular manufacturing process from the client's workstation to the manufacturing database management system.

Figure 1:
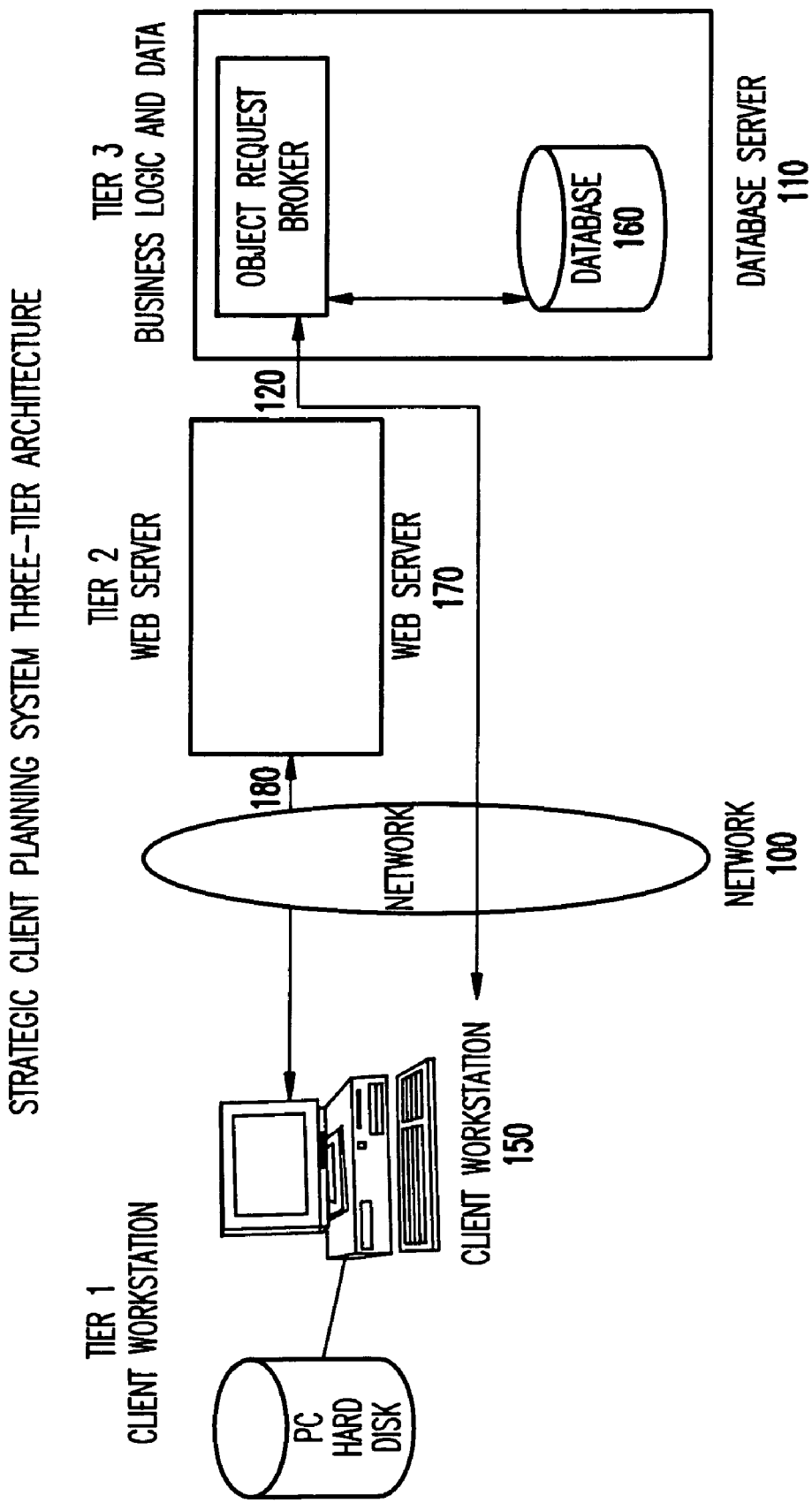
FIG. 1 is a diagram showing a computer network environment in which the present invention operates.

Referring now to FIG. 1, hardware and architecture for a system network 100 according to the present invention is shown in exemplary form. The computer network 100 includes at least one database server 110 that is connected through multiple data transmission links 120. It also contains a web server 170 that is connected through multiple transmission links 180. The present invention accesses and updates databases located on a remote or server computer 110 running a server process (hereinafter collectively called "server"). The typical remote server(s) 110 are computers (e.g., RISC-6000 AIX boxes). These data links are typically wireless links, optical fibers or standard wiring. The network 100 can be an intranet-based (LAN-based), Internet-based (URL-based), or extranet-based (WAN-based) linked network. At a typical manufacturing facility, multiple client workstations connect to the database server 110 and web-server 170. (Note that while there are typically many workstations, only one is shown for clarity). Also, the server 110 can be one or more servers that are interconnected at the facility. As shown, the client workstation 150 is connected to the web server 170 through the data links 180 in order to gain initial entry into the invention. Once access authorization is verified, the client workstation 150 connects directly to the database server 110 through the data links 120. The client workstation 150 then attaches to a database 160, residing on database server 110. The database 160 contains critical data files within the system. Preferably, the database server(s) 110 and the web server 170 are model RISC/6000 servers made by IBM, Armonk, N.Y., USA, which can execute an operating system (e.g., either Windows NT, LINUX or UNIX, OS/2, AIX, MVS, etc.), which interface with appropriate application program interface (API). (Windows NT, LINUX, OS/2, and UNIX are registered trademarks of their respective corporate entities). The database 160 preferably is a model DB2 database management system made also by IBM which can store and update critical information in the database.

The client workstation 150 (hereinafter collectively called "client") can be a general purpose personal computer (PC) that has a windowing-type operating system configured to run commercially-available graphical user interface (GUI) application such as the Microsoft Windows NT equivalent operating system in a network environment. A typical local (client) workstation 150 for implementing the invention is a general purpose PC. The PC includes a central processing unit (CPU), system memory, a modem or network card for connecting the personal computer to the Internet/Intranet, and a display, plus other components not specifically shown such as a keyboard, floppy drive, mouse, etc. While an exemplary local (client) workstation 150 preferably is a general purpose PC, as will be readily appreciated by those skilled in the art, other types and configurations of computers may be used.

Since all client and server computers will have, for the purposes of the present invention, the same properties, for simplicity of illustration and description, FIG. 2 and the following description illustrate and describe, respectively, the interaction between a single local (client) computer 150, a single remote (web server) computer 170, and a single remote (database server) computer 110. In this regard, as will be better understood from the following description, the present invention is preferably implemented as part of a computer program executing partially on a local (client) computer and partially on one or more remote (server) computers.

As shown in FIG. 2, running on the (client) computer 150 is a client process, specifically, a browser running a Java-based application referred to herein as a strategic client planning system (SCPS) application 200. The web server computer 170 contains the initial launch web page for SCPS and the current version of SCPS client code. It also contains the logon applet which is sent to the client workstation 150 upon initial startup of SCPS. The logon applet executes on the client workstation and establishes the initial connection to the database 160 residing on the remote database server computer 110. Running on the remote (server) computer 110 is a corresponding server process operating through the client to a server application which itself includes objects. In the context of the present invention, the server 110 may be any persistent object server which may be implemented, for example, in conventional database management systems, recoverable stream files, etc. The client objects when invoked send messages to server objects whose methods they wish in turn to invoke. These messages are not transmitted directly but are processed by an Object Request Broker (ORB) 125 which in turn sends messages on to the server object. The Object Request Broker is of use in a distributed computer network and conforms to the Common Object Request Broker Architecture (CORBA) objects defined by the "Object Management Architecture Guide," 3rd addition from the Object Management Group, Inc. Even messages between objects in the same node must pass through the ORB 125. Between the ORB 125 and server 110 is an object adapter 140 which, according to the invention, acts as a transaction layer imposing transactional properties on the messages between objects.

Implementation of CORBA architecture is taught in commonly owned U.S. Pat. No. 6,178,463 entitled "object-oriented data processing system with transactional adapter," which is hereby incorporated by reference. The transactional adapter ORB 125 for an object-oriented data processing network maintains a tree of transactions corresponding to messages between objects. A message is transformed into a child transaction, but only when any access restrictions are met. Until then, it is held in a "pending" set which is part of the parent transaction's state definition. When a child commits, its parent maintains the access restrictions imposed by the child if the parent is recoverable and discards them otherwise.

Embedded in the browser 105 is a Java sign on applet and a Java application, forming the SCPS application 200. Connected to, and in communication with, the remote (database server) computer 110 is a database management system 160. The database system 160 may be located in the remote (database server) computer itself, or may be located remotely on a database server 110 as shown in FIG. 1. After the initial logon process described previously has completed, the client process is used to access data from the database 160 (i.e., the browser 110, requests data from a database 160). This is accomplished by the Java application 130 issuing a query which is sent across the network 100 to the database server computer 110, where it is interpreted by the ORB 125, that in turn can access the archival database 160 for the required data.

Note that the operational capability of the GUI interface of the windowing system is fundamental to, but distinct from the invention. The client workstation 150 typically is capable of supporting concurrent execution of a plurality of application programs such as a browser. These application programs are interfaced through a navigator function that is joined conventionally to the GUI. The GUI operating system is a software system which allows a client to directly manipulate the application programs by conventional I/O devices that include a CRT display, a keyboard, a mouse, or other user specified device in any combination. A file manager is also provided which opens, maintains, and closes files on behalf of the navigator function and the graphical user interface. The file manager operates in conjunction with one or more peripheral storage devices such as a direct access storage device (hard disk drive). The GUI operates conventionally as a windowing system well known in the software arts. One of the many advantages of such GUIs includes quick and easy platforms for displaying frequently used or required data by selecting and manipulating graphical display elements, such as icons, with a pointing device, such as a mouse.

The browsers 105 that are able to run on the client workstation 150 include Netscape's Navigator or Microsoft's Explorer browser (Registered Trademarks of Netscape and Microsoft Corporations). The browser 105 is an application configured on the workstation 150. The browser provides a "container" wherein multiple active applications operate that can use Sun Computer's Java programming language or Microsoft ActiveX/OCX "object" technology to implement application objects. It is understood, however, that application objects can be any application that meets the API specifications of the GUI.

The preferred objects of the invention are "applets" that are part of Java (a trademark of Sun Corporation) programming language developed by Sun Microsystems, Inc. in Mountain View, Calif. Sun defines Java as a simple, object-oriented, distributed, interpreted, robust, secure, architecture neutral, portable, high-performance, multi-read, dynamic, general purpose programing language. Java supports programming for the Internet in the form of these applets. Applets execute within a Java-compatible browser (e.g., Netscape Navigator) by copying code from the server to the client. By using standard hypertext markup language (HTML) syntax for Web-based pages, the Web browser 105 at the client's workstation 150 communicates directly with the web server 170. Through the use of an Object Request Broker, the client workstation 150 communicates directly with the database server 110. Java programming language provides machine independence and does not care whether a Java application resides on the client computer workstation 150 or the computer server 110. This allows the client's workstation 150 to assemble programs from components that are distributed on diverse nodes of the network 100, whereby downloading of entire program folders from various nodes in the network can be accomplished using JAVA applets.

In particular, the browser 105 installed on the client's workstation 150 that is used to display and edit SCPS application 200 data contents in tabular form, includes technical data that consist of design data, test data, design preparation instructions etc. When using Java language, data is linked through the database server 110 to the workstation 150. This technical data can be reviewed and edited at the client's workstation 150 by Java code, JavaScript, and JavaServer pages as provided by the server 170 that is independent of the source of this information residing in the network. The operation of the present invention is further illustrated using examples of a graphical user interface provided by the client workstation 150 as shown in FIGS. 3–6. Of course, those skilled in the art will recognize that the use of specific GUIs is merely a design choice, and other GUIs could be used without departing from the scope of the present invention.

In the present invention, the SCPS application 200 provides the user interface for inputting data into the remote database 160. In a preferred embodiment, a user enters data in fill-in-the-blank style forms, and the SCPS application at the client workstation 150 transfers the information to the server 110 (preferably a DB2 server made by IBM) for storage into the remote database 160. These same forms can be used to retrieve and edit rows of data in records that already are in the remote databases 160. Further, a user can browse through all the records or look up a specific record in the remote database 160.

The SCPS application 200 is web-based and has user-friendly GUIs using a form-type format for creating secure complex queries based on selection of table(s), columns, and constraints, running the queries to create a snapshot of the database 160 data on their workstation, and editing the results of the query on their workstation 150, and when all edits are complete, saving the changes on the archival database 160. Also, the invention produces reports capable of summarizing information by selected groups, produces subtotals and grand totals if desired, and produces comparison reports on the delta between two similarly structured tables. Further, the invention provides the ability to make mass changes (cascade) to a set of related data, across multiple tables as well as provide an easily administered set of security and controls to ensure users update only the tables, rows, and columns to which they are authorized. Also, the invention provides the ability to initiate batch processes on the database server; and provides an automated method of maintaining the current level of software on the client workstation, to ensure that the client level of code is always current.

The user-friendly GUI provides the ability to build and execute a complex database query using a step-by-step process from the client workstation 150. There are two major paths available in the creation of a query, based on whether the user intends to create an updatable WorkSheet or a read-only report.

Creation of Updatable WorkSheets

Figure 3A:
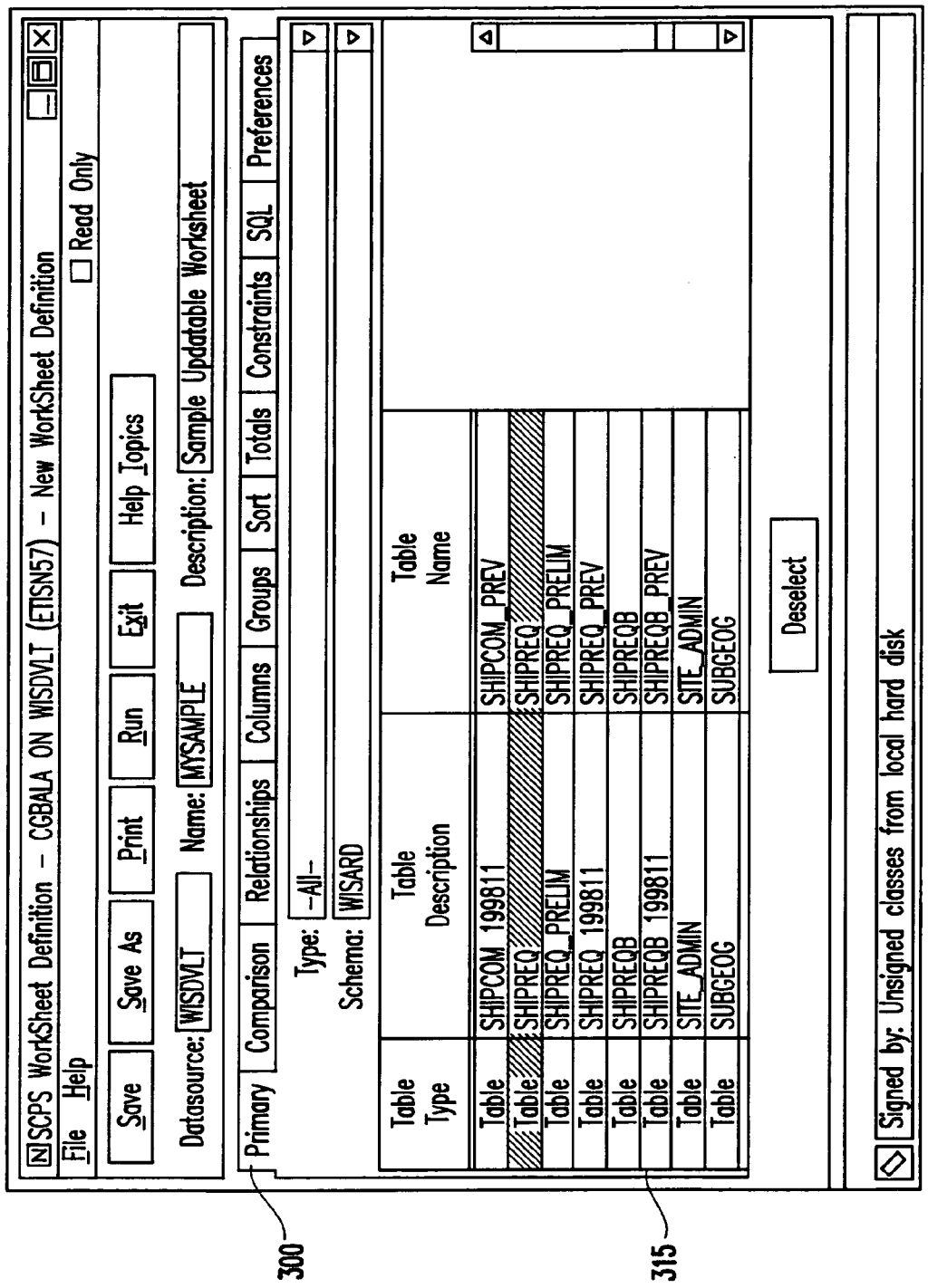
FIG. 3A illustrates a graphical user interface (GUI) displayed on a monitor according to the present invention.

The steps involved in creating an updatable WorkSheet are as follows. The primary table definition tab 300 is the first step of building the query statement. The schema and base table, view, or alias are identified that will be used in the remaining tabs. An example of the primary table definition tab 300 is illustrated in FIG. 3A.

The design of the relationship definition tab 310, illustrated in FIG. 3B, is the next step. This optional step allows users to select one or more related tables to the selected base table, view, or alias. Tables are defined as "related" via the database management system and also through the use of an SCPS definition of extended table relationships. The tables selected on the relationship tab 310 are joined together for purposes of selecting data or placing constraints on the query. The default join is an inner join; however, the user has the option to select an outer join 312.

Figure 3C:
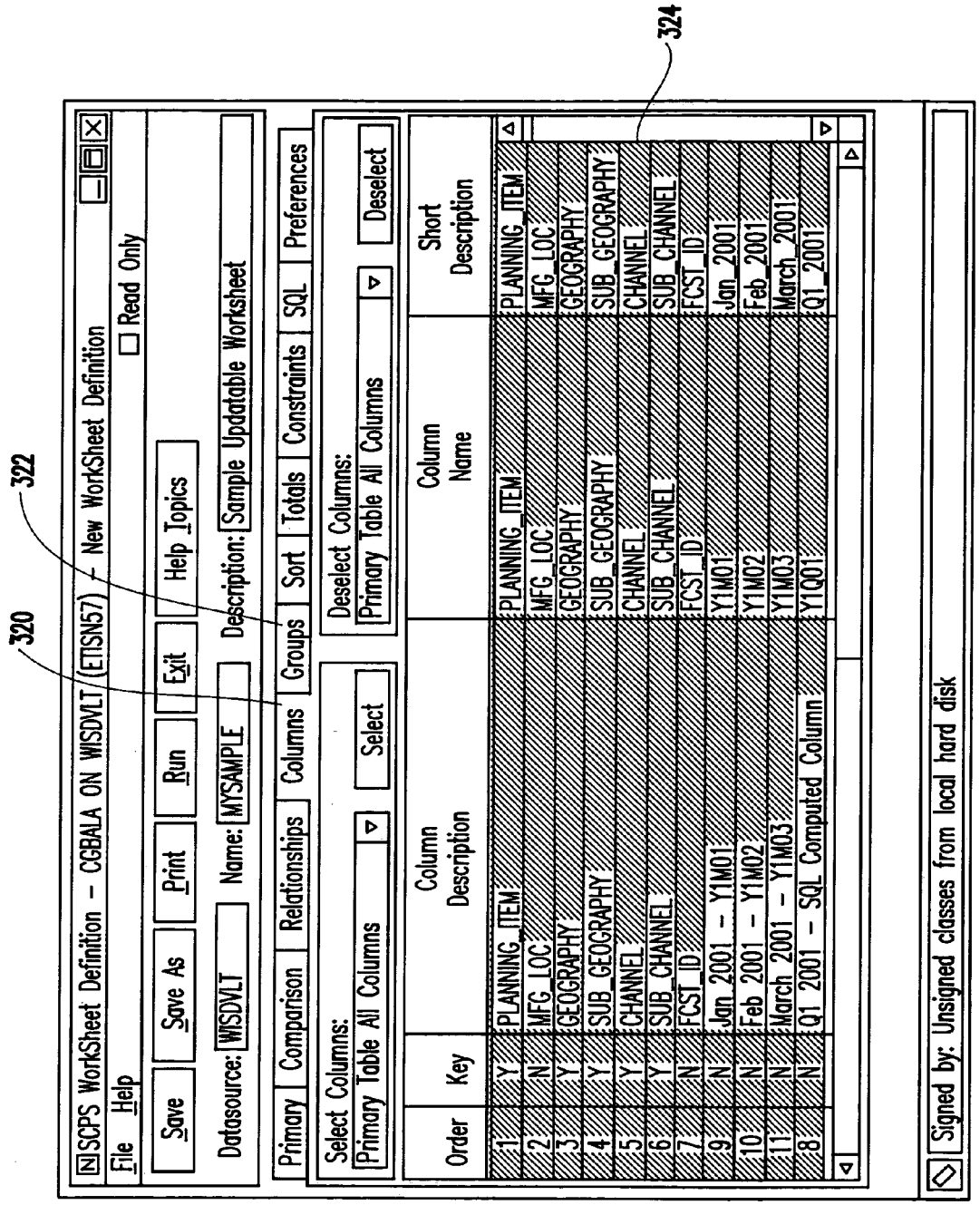
FIG. 3C illustrates a graphical user interface (GUI) displayed on a monitor according to the present invention.

The columns selection tab 320, shown in FIG. 3C, allows the user to select one or more columns from the tables selected in the primary and relationship tabs. The selected columns make up the "Select column1, 2, . . . " part of the query statement which is subsequently generated, executed, and displayed in the resulting grid. The columns tab 320 also constructs computed columns for tables, views, or alias that have time bucketed columns (YxMxx) 324. The application builds quarter, semi-annual, and annual total columns where needed.

The sort sequence tab 330 allows the user to create an order-by clause for the query statement and is optional. The columns available for sorting consist of the columns selected in the columns tab 320 and is further restricted by the columns selected in the groups tab 322. The user selects the columns to be used in the order by clause, and the sequence of the ordering. The sequence sort tab 330 is shown in FIG. 3D.

The totals definition tab 340, illustrated in FIG. 3E, allows the user to create additional computed columns for the query statement. The tab also allows the user to define additional properties for the results which are not part of the query statement, such as calculated columns (c=a+b). The additional computed and calculated columns will not be updatable on the resultant WorkSheet; however, all other columns belonging to the primary table will be updatable. The totals definition tab 340 also allows the user to define Summary rows (break totals), as well as determining the unit of measure for the display of numeric data. However, the WorkSheet becomes read-only if break totals are specified, or if the unit of measure differs from the database representation of the data.

Figure 3F:
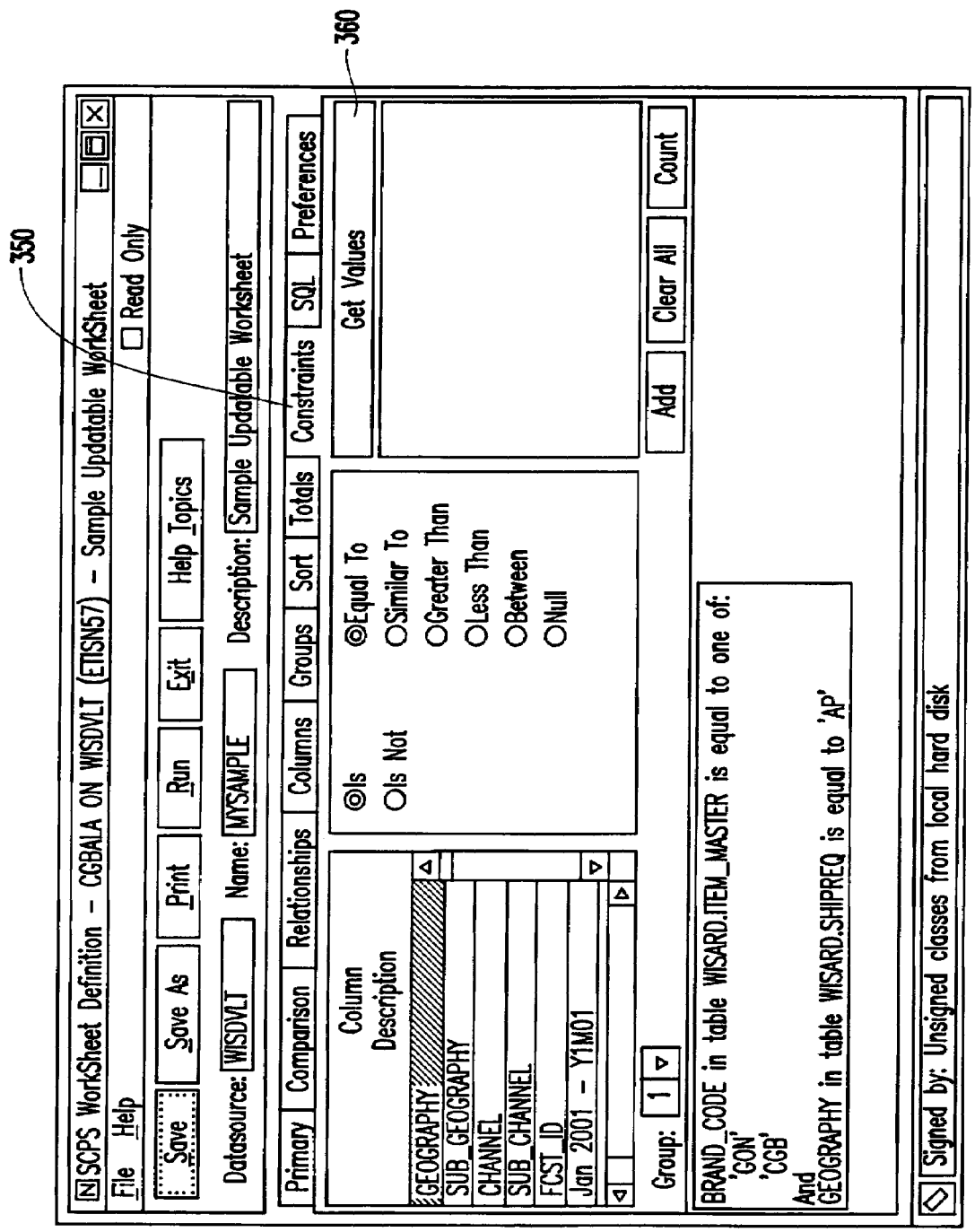
FIG. 3F illustrates a graphical user interface (GUI) displayed on a monitor according to the present invention.

The constraints definition tab 350, shown in FIG. 3F, is optional and is used to provide the WHERE clause of the query statement. Each constraint identifies a table column, the value(s) to be constrained, and the constraint type (equal, not equal, similar to, greater than, etc.). There are 1 to n number of constraint groups and there can be 1 to n number of constraint items in each group. The constraints in a group are and'd together and the constraint groups are or'd. This allows for parenthetical logic in the construction of the where clause. It provides the user with the ability to query the current database to determine the distinct values present in any column of the selected tables, as an aid in creating the query statement. It also provides the user the ability to count the number of rows which meet the query constraints. Using the "Get Values" button 360 also enables the user to search the database for distinct values which occur in a specified column, and to select those values for use in the constraint statement. Optionally, the "Get Values" function 360 may be used to retrieve a set of values from a file on the client workstation, and to use these retrieved values in the constraint statement.

Figure 3G:
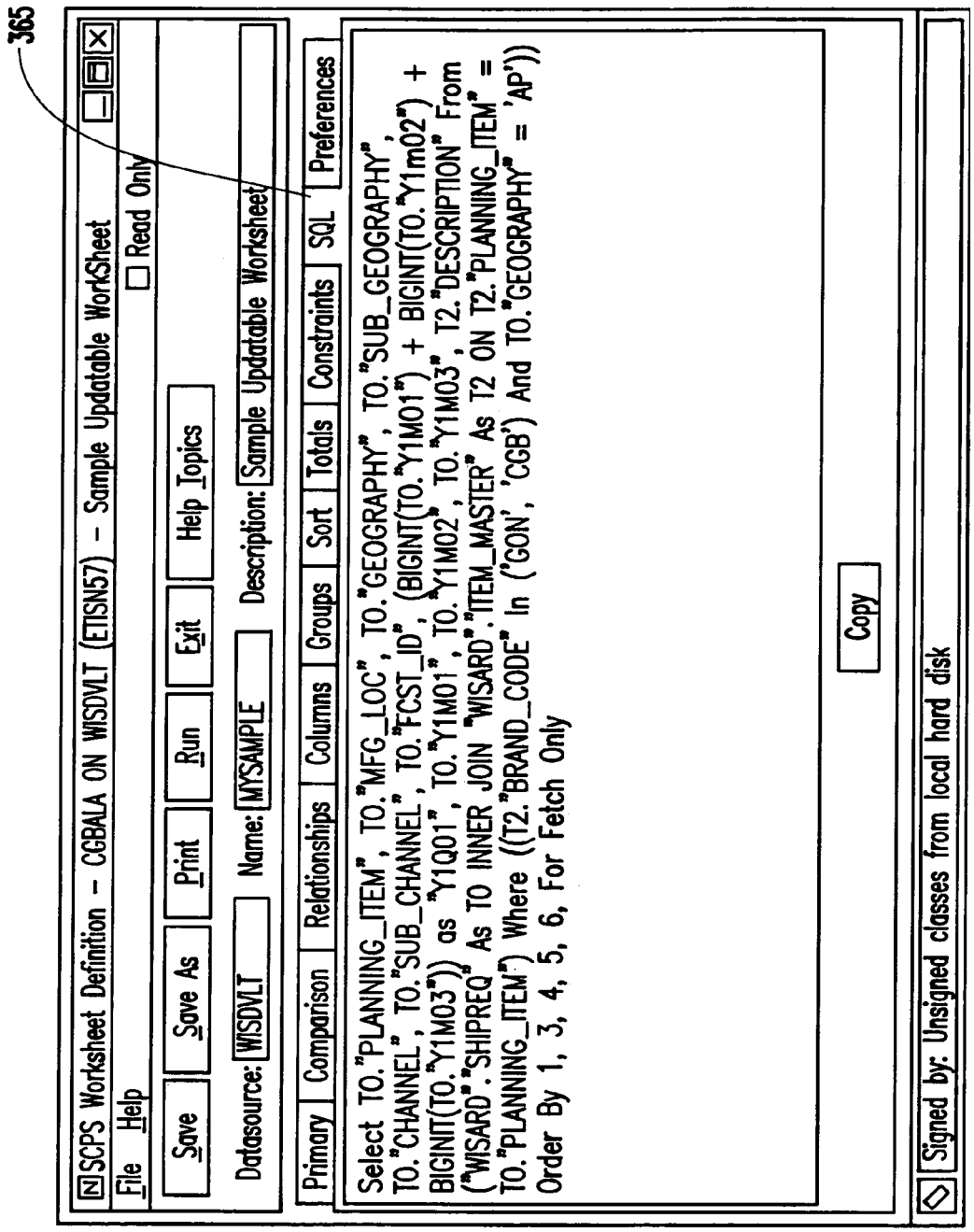
FIG. 3G illustrates a graphical user interface (GUI) displayed on a monitor according to the present invention.

The query tab 365 displays the resulting query statement that is generated from the selections in the previous tabs. The user can view but cannot modify the generated statement. The statement can be copied to the clipboard for later use with other query tools. The query tab 365 is illustrated in FIG. 3G.

Figure 3H:
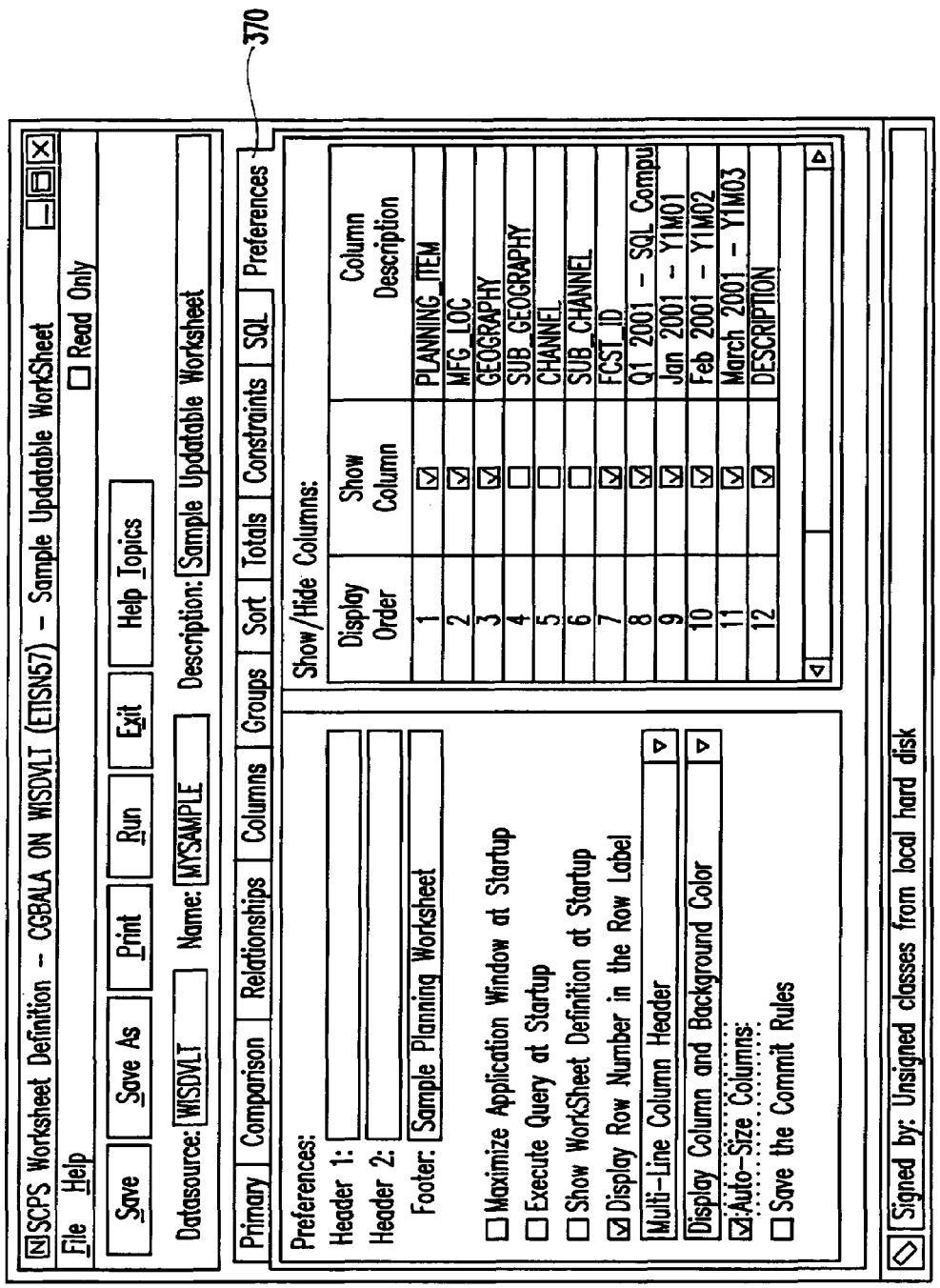
FIG. 3H illustrates a graphical user interface (GUI) displayed on a monitor according to the present invention.

The preferences tab 370, shown in FIG. 3H, is used to drive the display attributes of the worksheet grid, such as header titles, show/hide status of each column, initial worksheet window size, etc.

Creation of Read-Only Report WorkSheets

Any WorkSheet may be set to read-only by checking the Read-Only checkbox on the WorkSheet definition window. In addition, there are five other methods of creating a read-only Report WorkSheet.

The comparison definition tab 375, illustrated in FIG. 3I, is optional and allows the user to select a table that is similar in structure to the selected primary table, view, or alias. This tab is used for comparison reports where the user would like to see the differences between the primary and comparison tables. Four different types of comparison reports are available: comparison only; comparison with delta; delta only; and reporting on comparisons over a specified percentage delta.

Figure 3J:
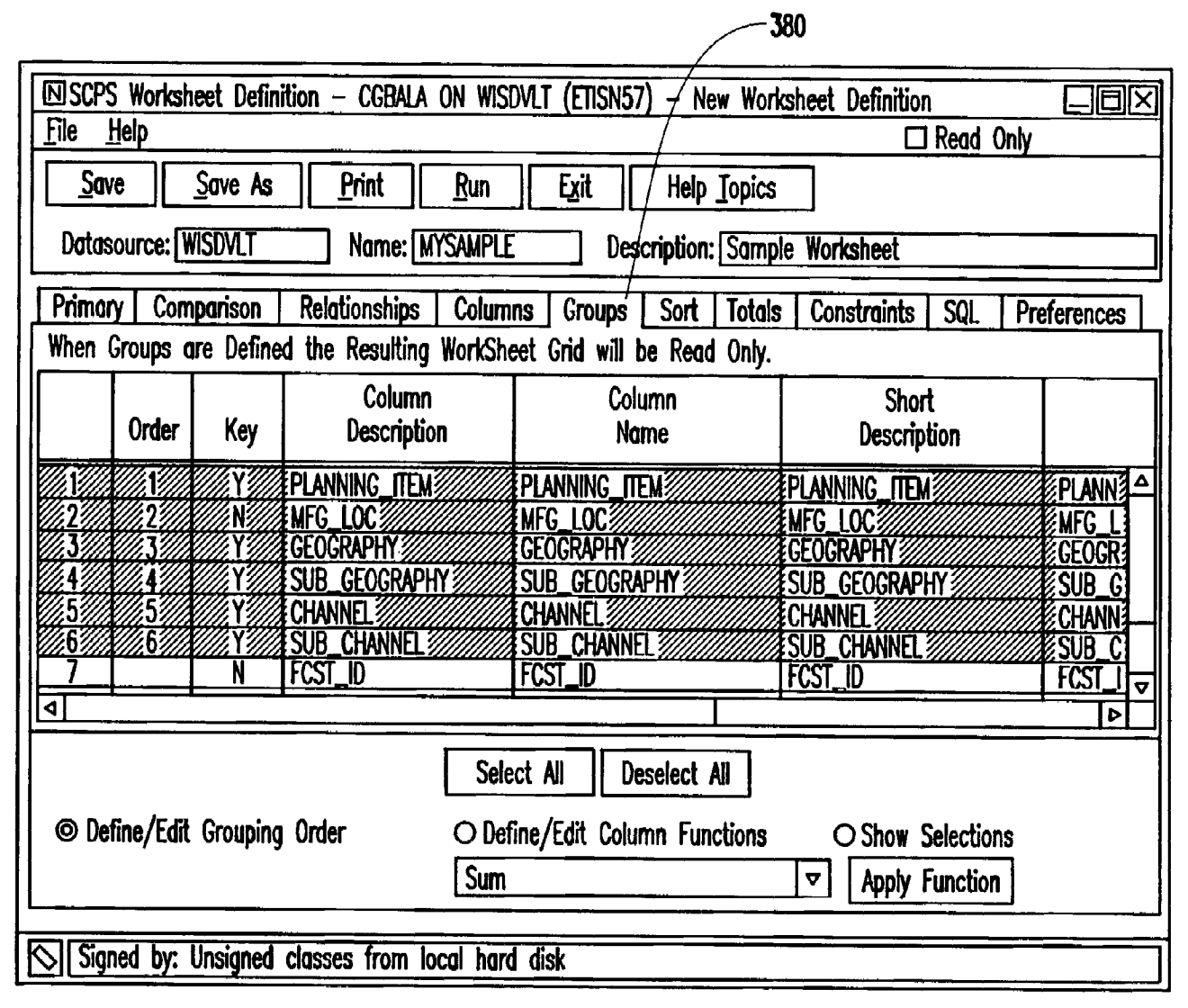

The groups definition tab 380, shown in FIG. 3J, allows the user to create a group-by clause for the query statement. This step is optional, and when selected the resulting grid will be read only, since the resulting data contains a summation or aggregation of data in the database. The user selects the grouping order columns and also provides the query column functions to apply to the numeric columns (e.g. Sum, Average, Minimum, Maximum, and Standard Deviation). The columns available for selection in the groups definition tab 380 consist of the selected columns in the columns selection tab 320. As noted previously, changing the unit of measure or defining Summary rows on the totals tab 340 will result in the WorkSheet becoming read-only.

The WorkSheet is defined as read-only if all the key columns on the primary table are not selected for use on the columns tab 320. The key columns are defined at the database level, and constitute a unique index into the primary table.

The worksheet is defined as read-only when a database "view" is selected as a primary table.

Specification of Read-Only Columns on an Updatable WorkSheet

The invention further provides a mechanism for specifying the updatability of each individual column on the resulting WorkSheet, as defined on an SCPS control table DATABASE_RULES defined on the database 160 on database server 110. This table identifies the columns which are to be protected from updates by general users of SCPS. "Power users" of SCPS may be specified, and will have the authority to update protected columns. Each column defined as protected must also have an associated trigger defined on the database to supply default values when a new row is inserted to the database.

FIG. 3A shows a GUI 300 for presentation of a front-end of the application with a tabbed format, making it easy for the user to build the query form 315 by proceeding through a set of tabbed panels. FIGS. 3A through 3F illustrate the sequence of steps involved to build a complex query on the contents of the Ship Requests table, SHIPREQ. The primary schema and table WISARD.SHIPREQ is selected in FIG. 3A, followed by the selection of two related tables in FIG. 3B. The selection of the individual columns to be retrieved from the database, and their presentation order, is shown in FIG. 3C. (Although not shown in the Figure, the column "Description" from related table "WISARD.ITEM_MASTER" was also selected). The sort sequence 330 is defined in FIG. 3D, and the constraints on the data is shown in FIG. 3F. The resulting query 360 is displayed in FIG. 3G. The presentation preferences 370 for the retrieved data is further defined in FIG. 3H. The resulting query 366, when executed on the database 160 on database server 110, retrieves 1,833 rows of 12 columns each, for presentation in the WorkSheet grid 400 illustrated in FIG. 4. The columns are shown in the order selected on the columns tab 320 (FIG. 3C). Although all columns specified on the columns tab 320 have been retrieved from the database, only those marked for display in the preferences tab 370 (FIG. 3H) are displayed upon initial presentation of the WorkSheet. The hidden columns can be displayed at the discretion of the user, through the use of the WorkSheet menu item. Note that in FIG. 4, the columns MFG_LOC and FCST_ID are shaded to indicate they are defined as protected read-only columns.

Figure 5:
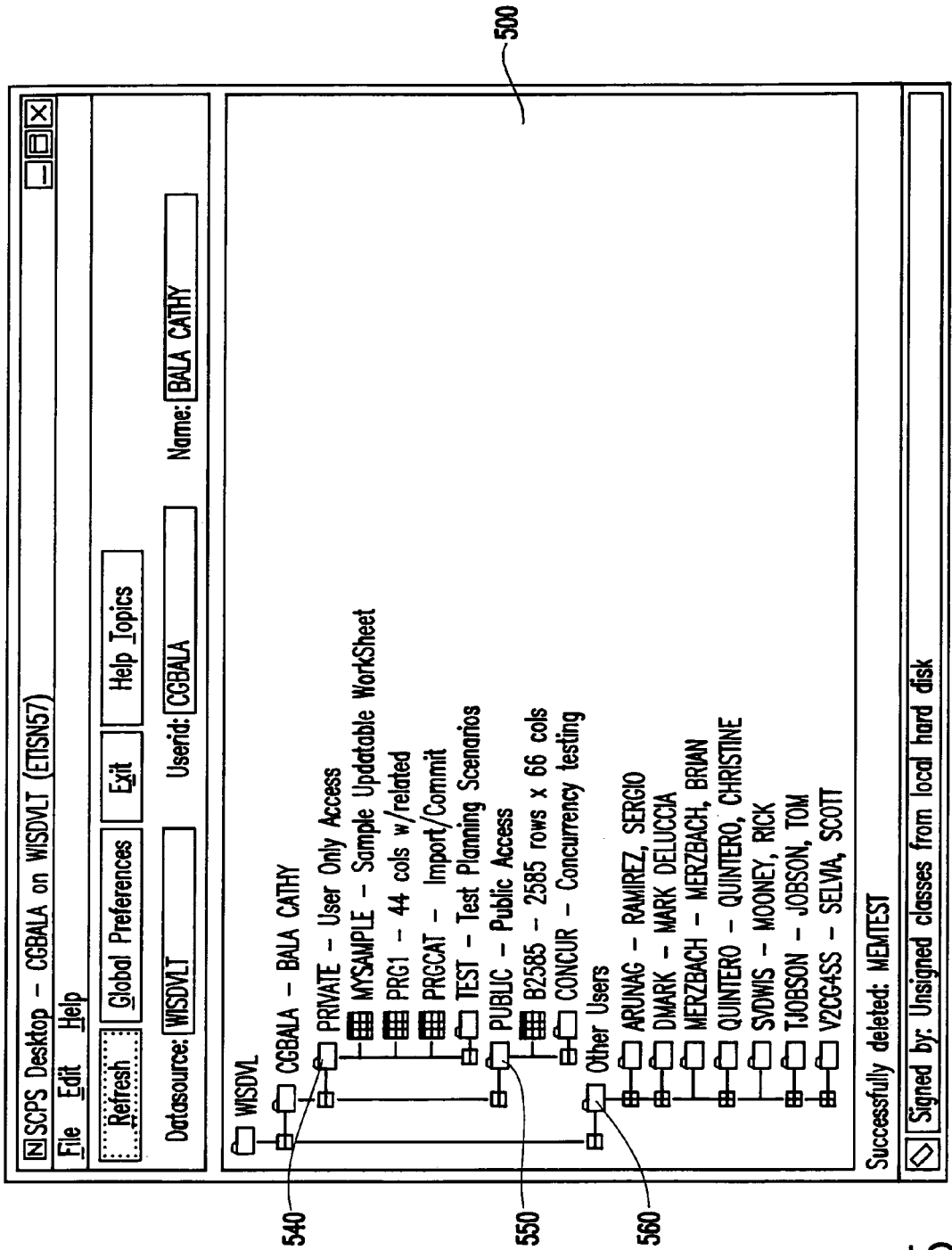
FIG. 5 illustrates a graphical user interface (GUI) displayed on a monitor according to the present invention.

This form of the SCPS application 200 provides a user with the ability to quickly update plans and schedules, produce reports, and make business decisions. The user can create complex queries, save them for future use, and make them available for sharing with other users of the database 160 in the computer network 100 by placement in a shared public folder 550 as shown in FIG. 5 below. Also, the SCPS application 200 allows users to migrate their workstations to a common client workstation platform which allows for improved productivity. The SCPS application 200 provides a user-friendly front-end to a database management system such as IBM DB2 database system by presenting tabular data information to non-technical users in a user-friendly manner for creating queries and making changes to data.

FIG. 4 shows the GUI of a WorkSheet grid 400.

The query and data are serialized and transmitted across a TCPIP network using the Common Object Request Broker Architecture (CORBA). For performance reasons, SCPS implemented a unique method of martialing and serialization which identified the data attributes of rows and columns of data. The basic Java classes and objects created for data transmission and storage are as follows. DBFetcherStmt class: fetches data defined by a connection and a SQL select statement. DataFetcher: the object responsible for initializing and loading data into a ManagedStore. SimpleStore: The base class for data storage which is loadable by a DataFetcher. ManagedStore: The Simple Store being loaded.

Once the user has created their query form 315, execution can be performed and required data is retrieved which is downloaded to their workstation 150 in a grid format called a WorkSheet grid 400. If desired, changes to the data on their workstation 150 can be performed by inserting, deleting, or updating rows; importing data from the clipboard or from files; and by using editing features such as find/replace and copy/paste features, which are provided in the SCPS Java applet, and which execute in a browser environment.

The changes are displayed on the WorkSheet copy of the data, but are not changed on the database 160 until specified by the user by hitting the button save changes 425. These features provide planners with the ability to work with their own copy of large amounts of interrelated data (such as forecasts, build schedules, or bill of material structures), without updating the database until they are satisfied that the modified plans are ready for use by processes or users executing on the database 160. Typically, much of a planner's responsibilities entails modeling "what if" scenarios and responding to changes in supply and demand. Therefore, it is crucial to have the ability to create ad-hoc queries and modify varying sets of planning data before updating the database 160 with an integrated plan. They also require the ability to share plans and schedules with planners at other locations, and use this data in the formulation of their own plans. The SCPS application 200 provides this capability to share queries, and to integrate plans from multiple changing sources by use of the WorkSheet "import" feature 435. The ability to share queries is provided through the generic DeskTop function provided upon first entry into the SCPS application 200.

FIG. 5 shows a GUI 500 wherein each user has two folders, a private 540 and a public 550 folder. Queries that are to be shared with other users are placed into the public folder 550. The shared queries that have been made available by others are accessible, grouped by userid, in the "Other Users" folder 560. All shared queries are editable only by the owner, thereby providing ownership and control. The ability to store queries, rerun them when desired, and share them with others has provided improvements in data analysis, communication, and productivity.

In addition to the obvious advantage of providing non-technical users with the ability to create their own queries and update a database, the SCPS application provides an environment which allows easy administration of database security, and provides "Super Users" an ability to change access permissions to tables quickly so as to "lock" them from updates during critical processing cycles. The advantage of this feature is that it provides a simple method of ensuring data integrity without requiring the "Super User" to have database administrator authority. During the installation of SCPS, several control tables are added to database 160 for the purpose of defining SCPS parameters and table security authorizations. Individual tables are specified on the four major tables, containing table information, including individual table and schema names, and the assignment of an Option Code to each unique table. Also contained are user information which is global to the entire database, including userid, user name, flag indicating if a "Power" user, and a switch indicating if the userid is to be activated for access. A table contains information listing individual userid and Option Code information, with an Access Code assigned to each userid/Option Code combination. Access codes determine the table authorization (select, update, insert, delete, control) to be granted to the userid for each set of tables sharing the same Option Code. A table contains the unique authorization patterns associated with each access code. For instance:

| ACCESS CD | CONTROLAUTH | DELETEAUTH | INSERTAUTH | SELECTAUTH | UPDATEAUTH |
|---|---|---|---|---|---|
| CA | Y | Y | Y | Y | Y |
| E1 | N | N | N | Y | N |
| E2 | N | N | N | Y | N |
| E3 | N | N | N | Y | N |

A batch program is executed to review the current security authorizations for each user, as compared with the authorizations as defined on the SCPS control tables. Any deviation from the control table definitions will result in database grants or revokes being issued to force the authorizations to be in compliance with that specified on the SCPS control tables. This batch program is executed on a regularly scheduled basis, and may also be easily initiated at will by an authorized security administrator, using the SCPS "Run Security" option from the Desktop window in FIG. 5.

Figure 6A:
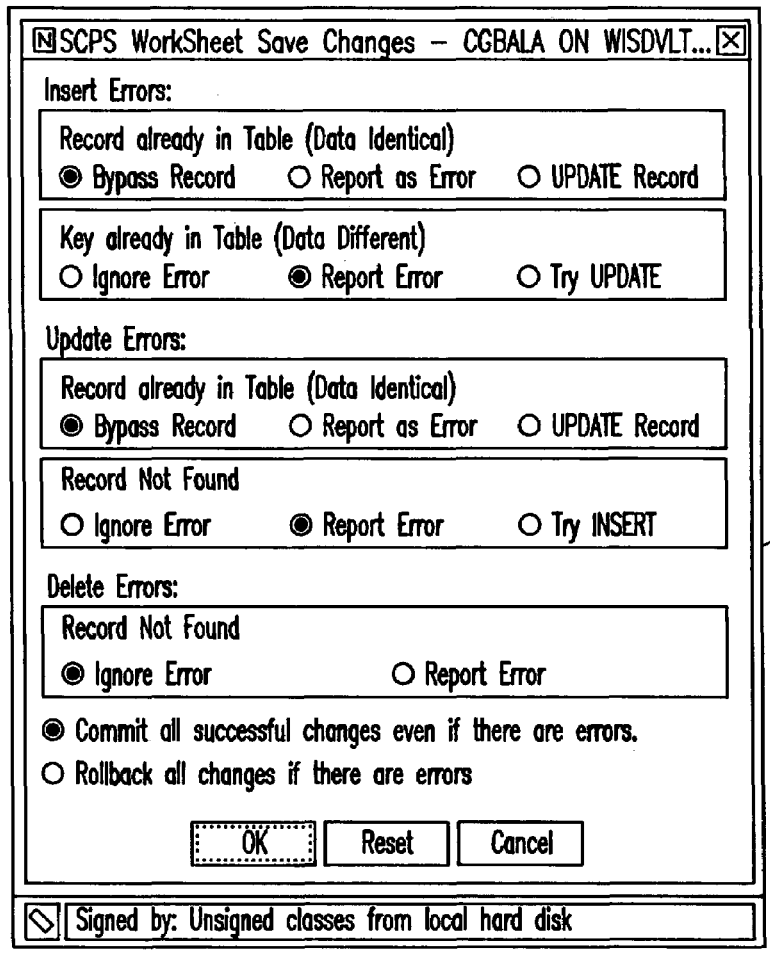
FIG. 6A illustrates a graphical user interface (GUI) displayed on a monitor according to the present invention.

FIG. 6A shows another GUI 600 of the SCPS application 200 which provides options for managing commit errors prior to archiving updated data in the database 160. For example, users of SCPS 200 may specify whether all updates should be rolled back from the database if any errors occur. It also enables the user to determine the disposition of duplicate key conditions (bypass, report as error, or try update). The SCPS commit options window is shown in FIG. 6A.

Figure 6B:
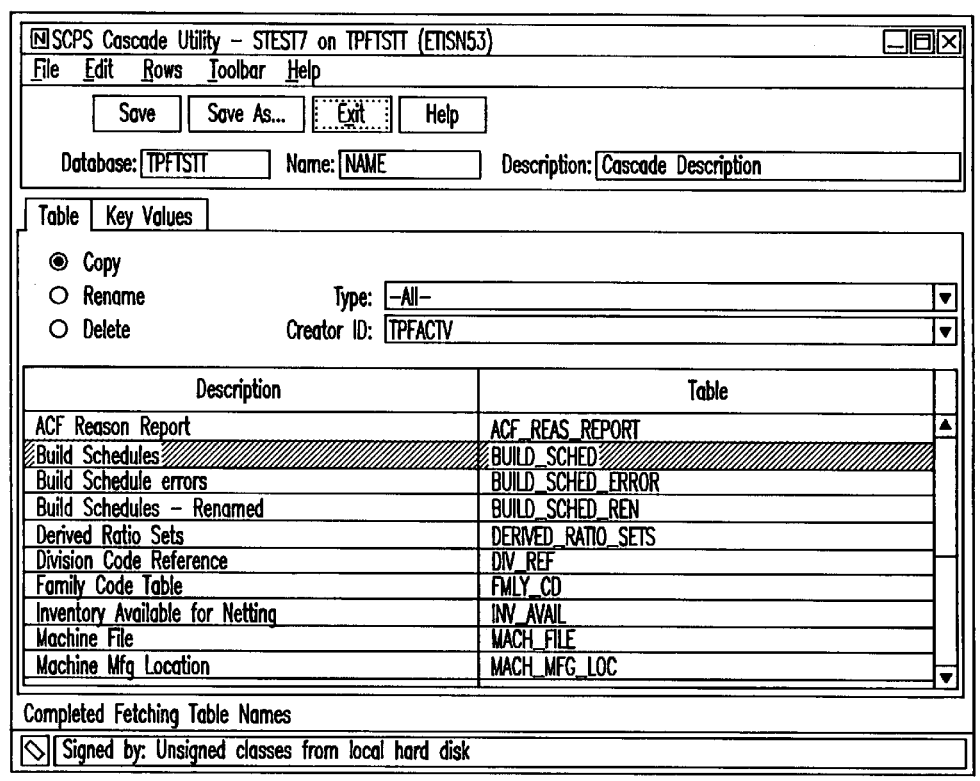
FIG. 6B illustrates a graphical user interface (GUI) displayed on a monitor according to the present invention.
Figure 6C:
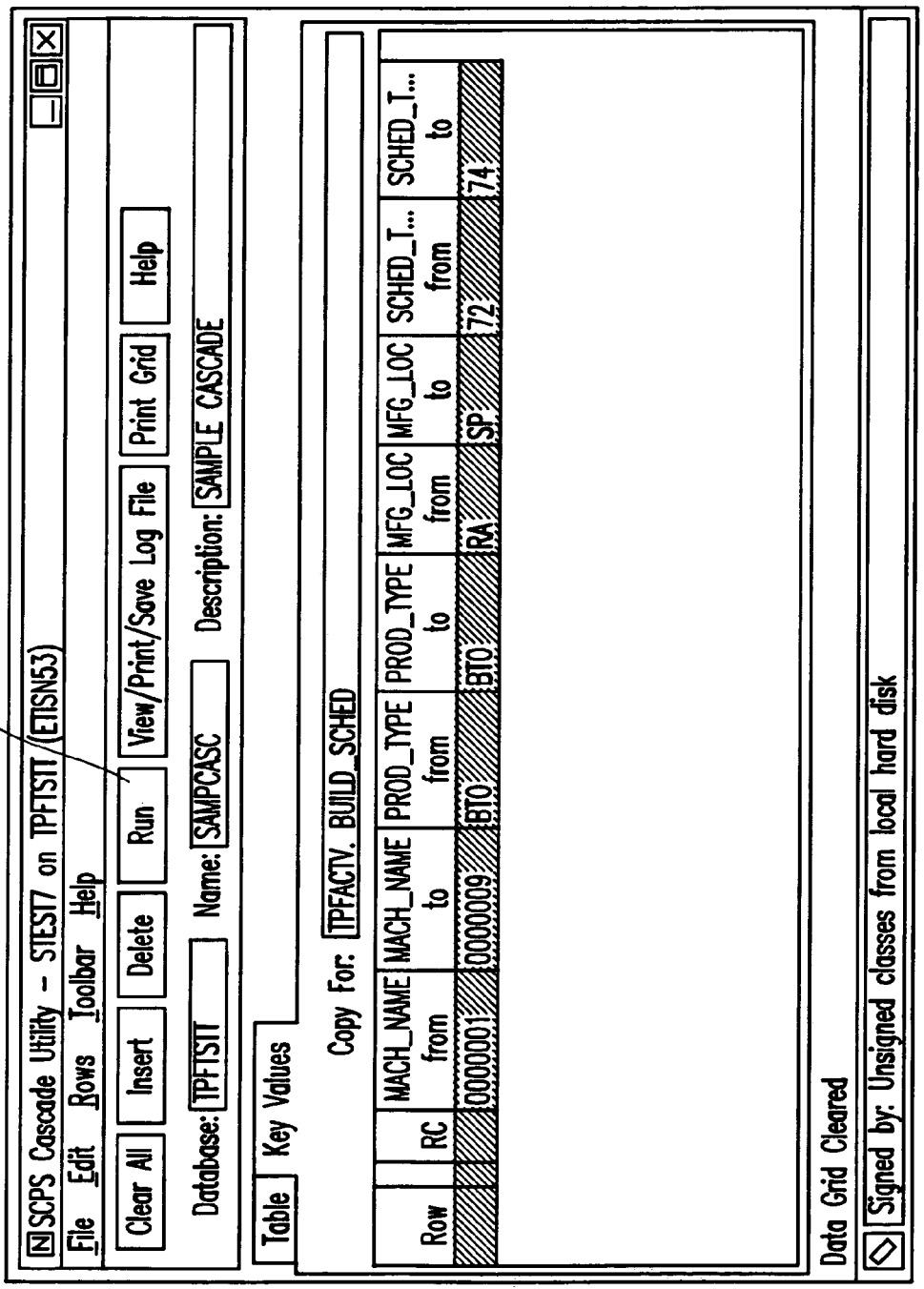
FIG. 6C illustrates a graphical user interface (GUI) displayed on a monitor according to the present invention.

FIGS. 6B and 6C illustrate the use of the "Cascade" mass update feature provided in SCPS. Cascade allows the user to make mass changes to sets of related data across multiple tables. In FIG. 6B, the table named TPFACTV.BUILD_SCHED has been chosen to use as a model in creating a new machine type in the database. This is accomplished by means of copying all data related to a machine type, and renaming specific key elements to create a new machine type. In FIG. 6C, the user enters in the unique key information relating to the current machine type to be used as a model, followed by the new key. In the example, machine type '0000001' is used as a template in creating a new machine type '0000009', with changes to the MFG_LOC and SCHEDULE_TYPE values as well. When the user presses the 'Run' button 620, the contents of the entry grid are sent to the database server 110, in the same manner as WorkSheet updates are sent during a commit. The SCPS code on the database server then initiates a batch process to create and execute the database select and insert statements which will create this new machine type. Entries will be inserted in all supporting tables to create this new machine type with the same planning information (i.e., bill of materials, description, etc.) with the unique key specified on the Cascade window. Cascade also enables the user to perform mass deletes of related data, and mass renames of keys across related tables.

Figure 7A:
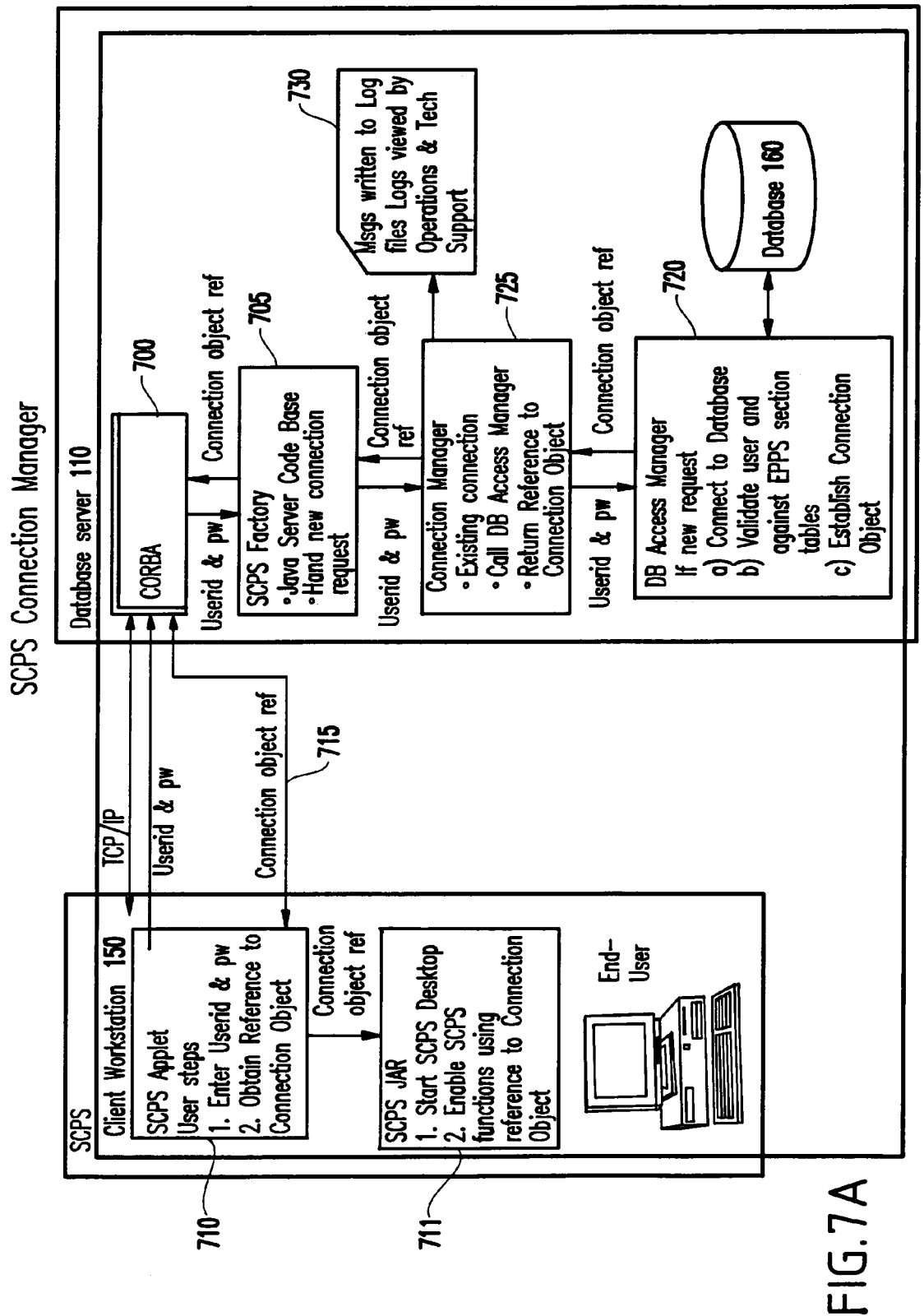
FIG. 7A is a diagram showing a computer network environment in which the present invention operates.

The overall Java architecture of SCPS is illustrated in FIG. 7A. The end-user 150 launches the SCPS application 710 by accessing a URL through a browser on the client workstation. Userid authorization is validated at the database server 110, and the current version of SCPS is downloaded if necessary. All subsequent database actions flow through the CORBA interface 700 and the SCPS Java factory 705. More specifically, the SCPS Applet 710 receives the Userid & password and obtains a reference to a connection objects 715. Once the connection object reference 715 has been obtained, the SCPS JAR 711 starts the SCPS desktop and enables the SCPS functions using the reference to the connection object 715.

Each user's connection to the database is managed through the use of a Connection Object 715. The Connection Object 715 is established upon initial logon to the application, and is referenced by the user throughout the use of the SCPS session. The Connection Object 715 is terminated upon exit from the SCPS Desktop.

Figure 7B:
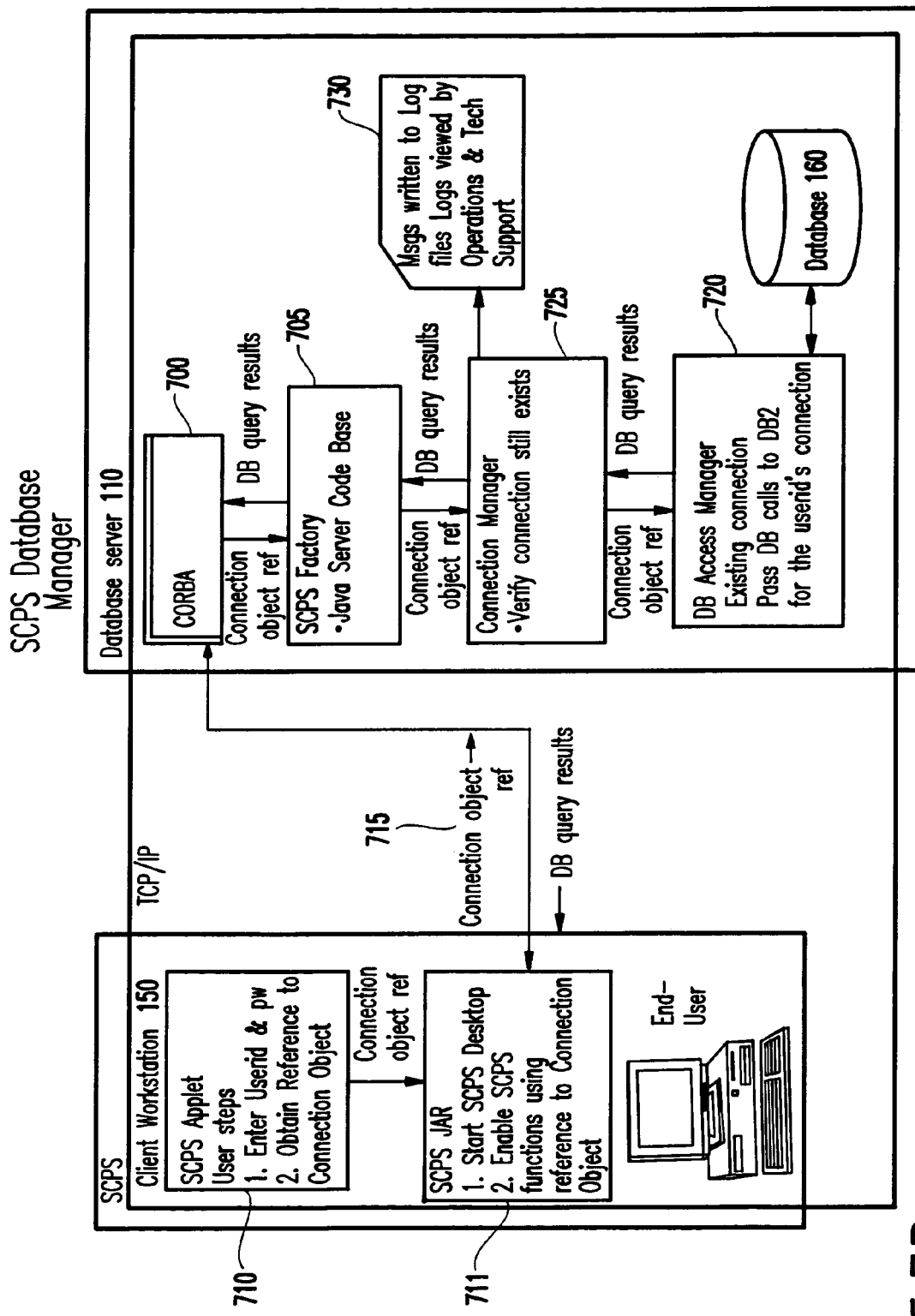
FIG. 7B is a diagram showing a computer network environment in which the present invention operates.

FIGS. 7A and 7B illustrate the Database Manager function 720 of SCPS. The database query is passed via the CORBA interface 700 to the database server 110, referencing the Connection Object 715. The SCPS Java factory 705 passes the query and the Connection Object to the Connection Manager 725, which validates that the connection still exists. The query and Connection Object are then passed to the Database Manger 720, which interfaces with the database 160. The query results traverse the same path back to the client workstation. Updates to the database follow the same path. Therefore, as shown in FIG. 7A, the SCPS factory 705 provides the Java server code base and handles the new connection request. In addition, the connection manager 725 checks for a valid AIX id, calls the database access manager 720 and returns the reference to the connection objects 715. In addition, the connection manager writes messages to log files 730 that can be viewed by operations and technical support units. In FIG. 7A, the database access manager 720 connects to the database, validates the user authority and establishes the connection object before the new request. To the contrary, in FIG. 7B, once the connection object reference 715 has been established, the SCPS factory 705 does not need to handle any new connection request; the connection manager 725 only needs to verify that the connections still exists; and the database access manager 720 merely passes the database calls for the previously established connection. More specifically, FIG. 7C illustrates the main SCPS desktop 750 created on the workstation 150. In item 751, the user can select either a new or existing worksheet object. If an existing worksheet object is selected, item 752 determines whether the user is the owner of the worksheet. In item 753 if the user is not the owner of the worksheet, they are allowed read only rights to the worksheet. If the worksheet is new or the owner is working on an existing worksheet, processing proceeds to item 754, where the user creates an id, selects tables, columns, groups, totals, sorts, etc., specify selection criteria, as well as selects the type of view (e.g., Standard Query Language). In item 755, the invention executes a snapshot from the database 160 and creates the worksheet/report. Item 757 represents the editing of the worksheet including common functions such as inserting, deleting, updating, importing, replicating, calculating, etc. possibly using imported user data 756. In item 758, the invention saves the edited worksheet to the database 160. If the save process is unsuccessful (item 763), the save error is display as shown in item 759. More specifically, the invention includes error messages for each row, the user edits, or the invention can cancels changes. If a referential integrity RI error occurs, based on a related table worksheets 760 (e.g., parent/child worksheets), the invention allows the user to modify the related worksheet to eliminate the error. After the errors are corrected, the processing again attempts to save through item 758. If the save is successful, processing proceeds to item 764 which displays a successful save message with statistics, refreshes the snapshot and displays the saved worksheet. Next, in item 762 if the user is the owner of the worksheet, the work sheet object is saved in item 761.

FIG. 7C illustrates the typical process for creating and using an updatable SCPS WorkSheet. After the WorkSheet is defined, the query is executed and the results are populated on the WorkSheet grid. The user may insert and delete rows, and edit existing data cell by cell. SCPS functions may be used to execute replications of data, find/replace, copy/paste, calculations, or importing from a file. The data is saved to the database using the Commit Rules selected by the user. Any errors found are displayed in grid format. Errors due to parent-child restrictions on the tables (i.e., referential integrity) may be resolved by selecting the row in error and prompting SCPS to open another edit WorkSheet on the referenced table.

After all data changes have been accepted and errors resolved, the WorkSheet is populated with a new snapshot of the data, using the original query defined for this WorkSheet. The WorkSheet definition is saved as a serialized object, called the WorkSheet Object, in an SCPS control table DESKTOP_OBJ_DEF, on the database 160.

The methods implemented in order to create and store SCPS WorkSheets, and to execute database queries and commits is outlined below.

WorkSheet Definition:

SCPSDefinition Base Object: Serialization was implemented as part of the SCPSDefinition object, so that the attributes of the application could be stored. The serialization process converts the variables into encoded strings so that they can be sent across the network and stored on the SCPS control table on the database 160. The serialized object can then be read from the database and re-instantiated as a usable object.

DESKTOP_OBJ_DEF Database Table: In SCPS, the problem of global visibility of the definitions was solved by storing the WorkSheet definitions in an SCPS control table on the database 160. The DEFINITION column is defined as a varchar 32768 column. In order to shrink the size of the definition serialized string, the server code zips the object using the zip facilities inside of Java. Storage of the user's desktop information and definitions solved the problem of enabling WorkSheet definitions to be available globally, on any suitably configured client workstation, regardless of location. It also enables users to share selected WorkSheet definitions with other users of the same database.

SCPSWorkSheetDefinition Object: The SCPSWorkSheet-Definition object extends the SCPSDefinition base object.

The selected parameters from the GUI tabs are stored in the worksheet definition object, which is then stored in the database control table DESKTOP_OBJ_DEF. Since this object is serialized, the information for the worksheet definition can be reapplied to the GUI tabs, and the user can see their previous selections. GUI Tabs: Each tab on the SCPS WorkSheet definition GUI is defined as a Java Panel:

| | |
|---|---|
| SCPSPrimarySelectPanel: | The Primary Tab |
| SCPSComparisonSelectPanel: | The Comparison Tab |
| SCPSRelationshipSelectPanel: | The Relationship Tab |
| SCPSColumnSelectPanel: | The Columns Tab |
| SCPSGroupSelectPanel: | The Groups Tab |
| SCPSSortSelectPanel: | The Sort Tab |
| SCPSTotalSelectPanel: | The Totals Tab |
| SCPSConstraintSelectPanel: | The Constraints Tab |
| SCPSSQLStatementPanel: | The SQL Tab |
| SCPSPreferenceSelectPanel: | The Preferences Tab |

Once the user has created the query using the SCPS GUI tabs, they can save the WorkSheet definition to the database 160, and also run the sql statement generated so that they can edit or view the result set from the database in the SCPSWorkSheetGrid.

Swapper (Data Storage Management):

The purpose of the swapper is to provide a file swapping capability which manages memory. Due to the high volumes of data required by the planners to be downloaded to the client workstation, it is necessary to swap the data between memory and file on the user's hard disk. SCPS will periodically poll the user's machine for free memory. Polling occurs when the application components that can swap their data to disk are in use. These swappable application components are: the get values window (getting data from the database), the edit grid and the read only grid. When free memory falls below a predefined start swapping threshold during polling, all of the open swappable application components are directed to start swapping. Data is swapped to disk until free memory is above the predefined stop swapping threshold. The data SCPS holds in memory comes from multiple sources: the database, data files, the clipboard and the keyboard. When SCPS stores data from any of these sources in a swappable application component, the current amount of free memory is checked against the threshold. If memory is low when data is being loaded then the data may be swapped to disk immediately.

Classes Created and Updated to Implement Swapping:

The Swappable Interface is used by RHResourceHandler. The RHResourceHandler will call the startSwapping method on objects that implement this interface if they register with the RHResourceHandler.

SwappableStorage object can be used in the place of a Vector. Data stored in SwappableStorage is organized into blocks. Blocks are a maximum of 200 rows and are typically between 100 and 200 rows. A last access number is stored for each block in a vector. When a row is accessed, the block it is contained in is assigned the next access number. When data is initially loaded into the table, the access number is set to zero. Special care is needed to check for low memory during loading. Data is swapped to files in blocks. The block with the smallest access number is swapped first. Every table has its own swapper file. The empty space in the swapper files is managed and reused. Swapping only occurs on the client. There is a flag indicating whether swapping is allowed. This flag is only be set on the client side. This class implements Swappable. This class contains a vector and controls all interactions with that vector of data. This class can be used to replace a Vector of data. The methods have the same names as Vector methods for easy conversion from a Vector.

SwappableStorage must register and unregister itself with the ResourceHandler, query the resource handler for memory when data is inserted and release memory when told to by the ResourceHandler. It registers when it is initialized. It unregisters when its close method is called. It must manage which blocks of rows are swapped to disk, and recall rows from disk when they are needed. A close method cleans up disk space and unregisters itself from the ResourceHandler.

SwappableStorage keeps track of a last access index. The last access index is tracked per block of rows. The last access index is used to determine which blocks should be swapped first. The row numbers of the first and last row stored in the block are stored for each block. This information is needed because block size varies as rows are inserted.

A class variable called last_block_accessed stores the block number of the last block accessed. This variable is initialized to 0. When a row is accessed, the block it is contained in must be found. A search occurs to find the block where the first row <=row number<=the last row. The first block that is checked is last_block_accessed. If the row is not in this block and row number<first row, the previous block will be checked. If the row is not in this block and the row number>the last row, the next block is checked. This happens when the block the row is in is found. This is especially useful when data in the table is accessed sequentially (i.e., scrolling forward or backward).

The SwapperBlock class is the structure of the blocks held by SwappableStorage. It stores the following values for a particular block. Each block is responsible for swapping itself to and from the file.

firstIndex—The index of the first row stored
lastIndex—The index of the last element stored
swapped—Are the rows swapped to file
rows—The rows of data if not swapped
types—The types of the rows stored
lastAccessNum—The last access number of this block
fileIndex—The fileIndex into the SwapperFile The SwapperFileIndex class stores information about how to retrieve data stored in the SwapperFile.

location—The location of the data in the file
Length—The length of the data being stored The ResourceHandler class is used along with the other swapper classes. It handles checking how much memory and disk space is left. Swappable objects may register with it, and then be notified when they should start swapping. It contains constants for all thresholds, and runs as a separate thread.

The SwapperObjectPool Interface is used with the SwappableStorage to convert rows of certain types to byte arrays and back again. Implementations of this interface reuse objects where possible. The SimpleRowObjectPool implements SwapperObjectPool. The simple Row Object Pool is used with the SwappableStorage to convert rows that are of type SimpleRow between SimpleRows and byte arrays. ColumnInfo is used with the SimpleRowObjectPool. ColumnInfo is a repository for information about the column which came from the database. The ColumnInfo class also holds the methods used to encode and decode the SQL values in this column. SimpleRow is a class which holds the information required for a row in a SimpleStore. A SimpleStore contains a SwappableStorage that uses a SimpleRowObjectPool.

Swappable Storage is used in the following. The Edit Grid, The Read only grid without Delta Compare or Subtotals/Grand totals, and the Get Values Window (Data retrieved from database). Each of these objects holds its data in a SimpleTable object. SimpleTable extends SimpleStore. SimpleStore has a SwappableStorage object. When data is read from the database, byte arrays are returned. When data is first downloaded, it is formatted as byte arrays. If the data is stored in memory, it is converted to SimpleRows. If the data is stored on disk immediately, it is stored as bytes. The type of the row in SwappableStorage is used to determine if the row is original, updated, inserted or deleted. An object called SimpleRowObjectPool manages the specifics of swapping SimpleRows to and from disk and storing and retrieving specific fields from SimpleRows. The Read Only Grid with Delta Compare or Subtotals/Grand totals: Each of these objects holds a SwappableStorage object. An object called VectorObjectPool manages the specifics of swapping Vectors containing Strings to and from disk and storing and retrieving specific fields from SimpleRows.

Query Execution and Database Updates:

The idea behind the classes built to support the execution of queries and database updates was to build a set of classes that could be executed on either the client or the server to access the database in order to control how the database is accessed. There were many benefits to encapsulating the database functionality into a set of classes. One of the benefits was that when improving performance or enhancing functionality, the changes only needed to be implemented in one place, and the benefits would occur on both client and server. Another benefit was that it allowed a division of labor such that a small number of developers were required to work directly with the database.

The application was designed to execute all of the queries on the application server where the database resides. This was done in order to control the flow of the data from the server to the client. Data is returned from the database query one row at a time, with each row represented as a series of bytes which are then decoded on the client workstation side. Meta data about the fields that were selected from the database is sent to the client, so that the client can decode these rows. Blocks of rows are sent from the server to the client when data is selected from the database. The server reads enough rows for the first block of code and sends the rows to the client. While the server is reading the next block of rows from the database, the client is processing the first block. When the client is done processing the first block, the second block has arrived from the server and is ready to process. This process of keeping both the client and the server busy at the same time was implemented for performance. The client reports statistics about what it has read to the server when it completes reading all blocks. The server checks the statistics for accuracy. The data is then available to the user to process.

When the user on the client workstation edits the data, the rows that are changed are marked for update on the client side and the changes are stored on the client side in addition to the original data. It is important to have the original data as well as the new values in order to commit the data to the database according to the commit rules. The commit rules are required by the planners use of the data. One of the things the planners do is export the data from SCPS, and import it into other applications to create "what if" scenarios or execute complex macros on it. They then want to save those changes to the database. They do this by importing the data into SCPS and committing it. They then choose the commit options of "insert errors", "try update", and "update error". This makes the apparent insert the update it really is. Many of the rules were designed to prevent undesirable results and compensate for when two people are editing the same data. For instance, if person A updates a row that person B deleted while A was working on the client workstation, choosing the update/try insert option will insert the row for A. The underlying business process utilized by the planning organization is also utilized to minimize collisions between users. When required, additional security can be provided through use of row-level authorization control on each table.

When changes to the SCPS WorkSheet are committed, only the rows that have changed are sent back to the server for update. The same process is used to transfer the rows back to the server. The data in the row objects are written in bytes and blocks of the rows are sent to the server. On the server, each row is processed one at a time according to the commit rules that were selected. After each block is processed, errors are reported back to the client for any rows that failed to update. When all rows have been processed, statistics are sent back to the client about how many rows were updated, inserted or deleted.

Classes Created and Updated to Implement Database Calls:
  SimpleRow: This type holds the information required for a row in a SimpleStore
    state: The current state of this row. The state will be one of the following values: row_original, row_updated, row_inserted, row_deleted. This value is used when committing data.
    rowData: Array of Cells containing the table's data. Each cell is an MSCell specific to the value the object contains.
    The type of cell created in a row for each column is determined by the type of the field in the database. This information is sent from the server to the client in the ColumnInfo object. When a row in bytes is converted to a SimpleRow, ColumnInfo is used to create the appropriate MSCell for each field.
  MSCell: This interface describes the methods for managing cell objects. This interface is implemented by the following classes.
    MSCellDecimal, MSCellDecimalWNulls, MSCellDouble, MSCellDoubleWNulls, MSCellInteger, MSCellIntegerFrozen, MSCellIntegerWNulls, MSCellIntegerWNullsFrozen, MSCellSmallInt, MSCellSmallIntWNulls, MSCellString, MSCellStringFrozen, MSCellStringWNulls, MSCellStringWNullsFrozen.
  ColumnInfo: Repository for information about the column which came from the database. This class also holds the methods used to encode and decode the SQL values in this column. This class contains the information about a field in the database. Some of the fields in ColumnInfo are from the ResultSetMetaData that is returned with the query:
    columnNoNulls, columnNullable, columnNullableUnknown: Used to determine if nulls are allowed.
    CatalogName, ColumnDisplaySize, ColumnLabel, ColumnName, ColumnType, ColumnTypeName, Precision, Scale, SchemaName, TableName, AutoIncrement, CaseSensitive, Currency, DefinitelyWritable, Nullable, ReadOnly, Searchable, Signed: Taken from the ResultSetMetaData.
    usedInCommit: This field indicates if the column is going to be used during a commit. Columns that are protected in the edit grid will not be used during commit.

protected: the DATABASE_RULES control table in the database indicates which columns are protected. This value is selected from that table.

isEditable: true if Writable and not Protected.

ENCODE_type: This value is determined by the type of the column, and is used when selecting which MSCell to create when processing the column.

ENCODE_nullsAllowed: True if this column allows nulls.

altNames: Array of alternate names for column headers. Used in grid.

columnWritable: Column can be written back to the database. (i.e., Column is not an equation and column is from the primary table.)

columnWriteName: The name to use for this column when writing it back to the database.

isReadKey: True if this column is in the read keys.

SimpleStore: The base class for data storage which is loadable by a DataFetcher. This class is on the client side receiving data from the server. This class is a TableModel that can be used with a Sun Java JTable to display data. It contains information about displaying the data, as well as the data itself.

dataFetcher: A reference to the DataFetcher used to load data into this SimpleStore.

keyIndexes: The key columns for this store.

columnInfo Array of column attributes (ColumnInfo).

rows: A Swappable Storage that contains and manages the rows in the SimpleStore.

loadState: The functions that can be performed on the SimpleStore are determined by the load state. The load state can be one of the following possible values: StateIsInitialization, StateIsLoading, StateIsLoaded, StateIsCancelPending, StateIsCancelComplete, StateIsReloadPending, StateIsDead, loadCanBeCanceled: When m_loadCanBeCanceled is set to true, the MSProgress indicator will show a cancel button, which when pressed, will call the cancelLoad( ) method. The default is false. This option is set to true when loading the grid so that the user can cancel the load if they decide during the load that they don't want to continue.

columnNameMultiLine: Convert underscores to newLines when showing the column name if true.

columnNameLC: Convert column names to lower case if true.

swappable: Determines if the object swap to file if memory is low.

objectPool: The object pool used if objects can be swapped to file.

SimpleTable: This class represents a SimpleStore tied to a database. The database table accessed by this object is read-only.

UpdatableSimpleTable: This class represents a SimpleTable which may be updated and have its changes committed back to the database.

SqlCommitRules: The commit rules used to save data back to the database.

errorCount: The count of SQL Errors detected during update database.

writeKeys: The keys needed to write the data back to the database.

DataFetcher: The DataFetcher is the object responsible for initializing and loading data into a ManagedStore. The DataFetcher is an abstract class from which data loaders can be derived. For loading database data into a managed table, there is a derived object DbFetcher.

name: The name to be associated with this DataFetcher to be displayed on the progress indicator.

columnInfo: The array containing information about each column.

storeCnt: Count of SimpleStore instances which have initialized a connection to this DataFetcher.

DbFetcher: The DbFetcher is the object responsible for initializing and loading data into a SimpleStore. The DbFetcher is an abstract class from which data loaders can be derived. Major objects derived from DbFetcher are:

DbFetcherCnstr—This fills a simple table from a SqlConnection object and a SqlConstraint object.

DbFetcherUpdater—This fills an updatable simple table from a SqlConnection object and a SqlConstraint object. It also contains the code to update the database when the user requests the data be stored back to the database.

SqlSelectDef: This class defines which data is retrieved from the database and how it is constrained. This class contains all information about the dynamic query that is being executed.

columns: The vector of columns to retrieve.

altNames: The vector of alternate column names.

constraints: The constraints to apply to the query.

baseTable: The base table for this selection.

tblKeys: The key columns for this table.

writeKeys: The key columns to use when writing back to the database.

distinct: when true, suppress duplicate lines.

groupByColumns: Columns to include in a Group By clause.

selectColumnInfo: The vector of column information to be added to ColumnInfo.

SqlCommitRules: This class contains the set of rules used by UpdatableSimpleTable to resolve conflicts with the database when updating the database. These conflicts can arise because the database is not locked during the entire editing time and the database may have changed during the editing session. The commit rules are: m_insertIdentical, insertDifferent, updateIdentical, updateNotFound, deleteNotFound and rollback.

SqlUpdateWithCommitRules: Class to manage SQL updates applying the specified commit rules. This class is located on the server and used by the DBFetcherUpdater.

DBFetcherStmt: This class fetches data defined by a connection and a SQL select statement. The resulting information is used to populate a SimpleTable.

sqlConnection: The database connection for this data.

selectStmt: The SQL select statement defining the data to get.

resultSet: The result set derived from the select statement.

meta: The meta data describing the column properties.

loadThread: The thread loading the managed store.

managedStore: The Simple Store being loaded.

loading: True while asynchronously loading rows.

msRowTransferBlockDispatcher: The transfer block used to send data to the SimpleStore.

MSRowTransferBlockDispatcher: Schedule and dispatch shipments of a block of rows to a SimpleStore. Reads from the database and creates blocks of rows. Each row is a byte array containing the row information. Is responsible for sending data to SimpleStore and ensuring all data is received. The SimpleStore is responsible for maintaining the order in which the data was sent.

DBFetcherSelectDef: This class fetches data defined by a connection, a SqlDataDef object, and a SqlTableId. The resulting information is used to populate a SimpleTable. This class extends DBFetcherStmt and sends it the SQL statement produced by the SqlSelectDef.

dataDef: The select definition used for this connection (SqlSelectDef).

table: The table used for this connection (null if this uses a combined DataDef).

keys: keys used by a combined DataDef.

updatable: whether query is updatable or not.

WorkSheet Grid:

The SCPS WorkSheet grid was designed as a medium to display the data retrieved from the database, and to provide a user-friendly mechanism for changing the data and committing those changes back to the database 160 on server 110. In order to accomplish this, a Java "bean"-like component was coded, known as the WorkSheet Grid. Java Swing classes (JFC) were utilized to create a table model which actually holds the data. The Jtable component of Swing only handles the visual representation, while a corresponding SCPS table model holds the data.

Since the WorkSheet Grid had to have the ability to display the data in alternate ways than it was actually stored in the database, it was necessary to build one generic table model that any number of other table models could implement and/or extend. The data being retrieved from the database was put into vector format suitable for the table models. Table models were built to support calculated columns, calculated rows, and delta compare reports. The base table model would be responsible for keeping track of row numbers and the change indicator (whether a particular row had been updated, deleted, inserted, etc.).

Besides these alternate ways of displaying data, there were other features that were needed on the WorkSheet Grid:

Anchoring columns—this was needed so that certain columns could be fixed to the left on the screen, and stay there while other columns were scrolled to the right. This was accomplished by building two separate Jtables and having them each have their own table model to hold the data. In this fashion, columns that needed to be fixed/unfixed would simply be moved from one table model to another.

Resizing/Reordering Columns—no special coding was needed for this, since this a feature of the Jtable class.

Copy/Paste—knowing which cells are selected is necessary for copy and paste. Once the range of cells is known, data can easily be accessed through the underlying table models. On paste operations, data checks are done to ensure that the pasted data is of the correct type corresponding to the column where it was being pasted.

Hiding Columns—a function of the underlying table models. Removing columns from the table models in essence "hides" the column.

Preferences to show/hide row numbers/change indicator—works the same as hiding columns—they are removed from table model of fixed part of WorkSheet Grid.

Changing column headers—the underlying table model also keeps track of column names, so they could be changed easily.

Data quantities—In order to change the display from units to thousands or millions, the logic was put in the table model. The table model would be told how the numeric data should be displayed.

All these above features, as well as being able to build calculated columns, calculated rows and delta compare reports are required as part of WorkSheet Grid. The WorkSheet Grid was implemented as follows.

1) The Table Models (Holding the Data):

The first step is to build the table models that will hold the data for the Jtable GUI component.

DGTableModel—The base table model—any table models to be used with the WorkSheet Grid must implement this interface containing the following methods:

setRowNumbersDisplayed—whether row number columns should be displayed.

setChangeIndicatorOn—whether change indicator column should be displayed.

getColumnOffset—returns the number of "special" (non-database) columns in this table model.

setColumnHeaderType—sets the type of column header (short name, long name, description).

setQuantityType—set how numeric column data should be displayed (units, thousands, millions, etc.).

getCalcColColumnInfo—return a ColumnInfo object of a column that makes up a CalculatedColumns.

getCalculatedColumns—returns a Vector of the calculated columns in the table model.

cleanUp—cleans up all class variable.

CCCalculatedColumnTableModel—The standard table model used when displaying data from database as-is or with calculated columns:

Must pass in a SimpleStore (data retrieved from the query) and a vector of CCCalculatedColumn objects if calculated columns were requested. This provides all the standard methods needed by a GUI component (the Jtable) such as getRowCount, getColumnCount, getValueAt, setValueAt, isCellEditable, etc. All these methods are coded specifically to handle any calculated columns as well as the row number and change indicator columns. For data from the database, it refers back to the SimpleStore object. Uses SimpleStore object to retrieve ColumnInfo objects as well. ColumnInfo object contains the database meta data. When calculated columns were needed, CCCalculatedColumn objects keep track of how to build them, and identifies the database columns which need to be summed.

CRCalculatedRowsTableModel—This model is used to hold data when the user desires to have calculated rows displayed in the WorkSheet Grid:

Must pass in a DGTableModel (i.e. a CCCalculatedColumnTableModel) and a CRCalculatedRow object that specifies how the calculated rows should be built. The CRCalculatedRow object keeps track of which columns are being summed, whether grand total rows are requested, and the column sequence.

This provides all the standard methods needed by a GUI component (the Jtable) such as getRowCount, getColumnCount, getValueAt, setValueAt, isCellEditable, etc. All methods are coded specifically to handle the calculated rows. For this reason, data is stored in a SwappableStorage object instead of a SimpleStore object.

DCDeltaCompareTableModel—This model is used when a Delta Compare report is requested:

Must pass in a DGTableModel (i.e. A CCCalculatedColumnTableModel), the report type (compare, delta), and an array containing the key column sequence. This provides all the standard methods needed by a GUI component (the Jtable) such as getRowCount, getColumnCount, getValueAt, setValueAt, isCellEditable, etc. Data is stored in a SwappableStorage container instead of a SimpleStore object. This is needed for the blank lines that need to be inserted that are not part if the data in the SimpleStore object.

2) Displaying The Data:

Once a table model is built to hold the data, a GUI component must be constructed to display that data.

DGDisplayGrid—this is a swing GUI component used to display the data fetched from a database. It extends a JScrollPane and contains a Jtable. It has the following characteristics:

Must pass a DGTableModel (one of table models listed above). These are the only table models that DGDisplayGrid knows how to display. This contains methods to change display of data: showing/hiding columns, changing column headers, fixing/unfixing columns. All work to change the display was done in either underlying table models or was a feature of Java Swing classes.

Column renderers were also needed to display numeric data differently than character data. The DGCellRenderer object was used to handle this. If data was numeric, the DGCellRenderer would force the data in that column to be right-aligned. If editing of the data was required, a DGCellTextField object needed to be created for each cell. The purpose of the DGCellTextField object was to allow for movement between cells (by tabbing, arrow keys, etc.) In addition, the DGCellTextField object allowed functions such as copy and paste to work properly.

Cascade:

Cascade utilizes the same table models as the WorkSheet grid in its presentation of enterable data fields. The unique features of Cascade are as follows:

CascadeIfc.java

This is the interface the client will use to execute cascade on the server. The method contained in it is called getDataGrid and it returns a Vector. The Vector will contain the log file results of the cascade run. The connection between the client and the server is established through a CORBA connection.

CascadeImpl.java

This is the class that implements the CascadeIfc interface. This class will execute methods on the server. The method it contains is getDataGrid. Vector getDataGrid (Vector data, String tableName, String creatorId, String processType): This is the method which calls cascade and returns the contents of the log file back to the client in a Vector.

scpscasc.sqc

This program is initiated by CascadeImpl which implements the CascadeIfc. It receives the key information sent by the GUI. It then calls recursive procedures which determine the related table information and execute the requested mass change (copy, rename, or deletion). Related table information is gathered by a method called "renRelInfo". Information about the key fields in the current table, and the corresponding key in child tables is collected. If the total number of primary keys of the current table is not equal to the number of keys specified in the database system relationships table, then that table is not processed because of partial inheritance.

The SCPS invention is easier for planners to use than conventional database interfaces for the following reasons. The GUI query builder is easy to use and allows a non-technical end-user to create complex queries with advanced database concepts such as joins, grouping, break totals, and sets of constraints linked by and/or relationships. It provides planners with the ability to work with and edit large amounts of data on their workstations, executing "what if" scenarios and modeling forecasts, and allows them to commit the changes back to the database at a time of their own choosing. Most easy-to-use GUI update tools execute the database update immediately after the user moves the cursor position off the current row, which is not desirable in the planning profession. It enables the user to replicate individual rows or blocks of rows in the editable grid, thereby providing the user with a template for creation of sets of data similar to data already existing in the database. Most table editors attempt to execute an insert statement on the database as soon as the row is replicated, thereby causing the insert to fail due to duplicate keys.

The invention provides users with a set of commit rule options which are applied at the time the data is committed to the database. This enables the user to choose the method by which errors are handled during the processing of database updates, deletes, and inserts. For example, the commit rules enable common scenarios such as imports of data to be changed to updates if necessary, without requiring the user to determine if each row in the import already existed in the database.

The invention provides a method of protecting columns from update on the editable grid. It provides a method of defining and administrating database table authorizations. The invention provides the user with information on table relationships without requiring the user to be familiar with the database model. It enables the user to define constraints using the NULL value. It allows the user to search the database for distinct values which occur in a specified column, and to select those values for use in the constraint statement. It enables the user to retrieve a list of items from a file, for use in the constraint statement.

When database error conditions occur due to parent-child relationships, SCPS provides the end user with the ability to identify the relationship and correct the problem by easily opening another editable WorkSheet. It provides the ability to execute mass changes across related tables on the database, using the Cascade function to insert, change, or delete entire sets of related data.

The invention enables users to share their built queries with other users on the same database. It allows users to view the query built by the GUI, and enables them to copy the query for use with other database tools. The invention enables users to work with alias tables and views, as well as real database tables. It allows the user to change the schema of the primary table on an existing WorkSheet definition, without requiring the user to redefine the rest of the query. It provides the ability to define extended parent-child relationships which are outside the scope of the database definition.

The SCPS invention is highly versatile and provides a model for use with any relational database. While the focus of the invention is to provide a set of query-building and data-editing functions for manufacturing planners, it is not unique to the planning environment. The invention can be applied for use with any relational database used by any customer set. It is particularly well adapted to those customer sets who require the ability to work independently with large amounts of data before committing changes to a central database. The invention provides a transparently distributed editor and control tool for remote database systems.

While SCPS as described above was implemented for use with a single relational database, the model could also be used with multiple databases that are joined together utilizing products such as IBM's Data Joiner. One implementation of this concept would be to define the joined databases as aliases with unique table schemas.

While the invention has been described in terms of preferred embodiments, those skilled in the art will recognize that the invention can be practiced with modification within the spirit and scope of the appended claims.

What is claimed is:

1. A method of querying a database through a secure network using a common object request broker architecture (CORBA), wherein said database is associated with a server computer running a server process, said server computer being connected to, and in communication with, a client computer through a network, said method comprising:

issuing, by a client process running on said client computer, a query form for data from said database;

sending said query form from said client computer to said server computer, processing said query form, by said server computer, and retrieving rows of data satisfying said query form from said database as a worksheet grid form defining selected tabular data, wherein said worksheet grid form comprises multiple rows of data;

sending said worksheet grid form from said server computer to said client computer;

packaging, by said client computer, said worksheet grid form representing updated data for marshaling tabular data for transfer between said client computer and said server computer, wherein said packaging of said worksheet grid form includes editing results of said query form and saving changes of data contained in said worksheet grid form in said database of said server;

updating said database through said network by transmitting said worksheet grid form from said client computer to said server computer; and wherein said updating of said tabular data includes making cascaded mass changes to a set of related data across multiple tables, and wherein said updating of said database of said worksheet grid form includes allowing only selected tables, rows, and columns to be updated by authorized users.

2. The method of claim 1, wherein said updating of said tabular data includes selecting tabular data summarized by selected groups.

3. The method of claim 1, wherein said packaging said worksheet grid form includes producing comparison reports on a delta between two similarly structured tables.

4. The method of claim 1, further including automatically maintaining a current level of implementation of said worksheet grid form on said client workstation.

5. The method of claim 1, further including controlling access to data of a user in said database by partitioning said database into private end public database, wherein said user controls said access.

6. A method of creating a tabular data stream for sending data between a client workstation and a server computer through a network using a common object request broker architecture (CORBA), said method comprising:

creating a query form in said client workstation;

receiving a worksheet grid form in response to said query form, said worksheet grid form defining selected tabular data, wherein said worksheet grid form comprises multiple rows of data;

packaging said worksheet grid form to represent updated data for said tabular data stream, wherein said packaging of said worksheet grid form includes editing results of said query form and saving changes of data contained in said worksheet grid form in a database of said server; and applying commit rule options, during said saving of said changes of data contained in said worksheet grid, to choose a method by which errors are handled during the processing of database updates, deletes, and inserts;

wherein said packaging said worksheet grid form includes making cascaded mass changes to a set of related data across multiple tables, and wherein said packing said worksheet grid form includes allowing only tables, rows, and columns to be updated by authorized users.

7. The method of claim 6, wherein said creating of said query form creates secure complex queries based on a selection of table, columns, and constraints maintained in a database of said server computer.

8. The method of claim 6, wherein said receiving of said worksheet grid form creates a snapshot from data in a database of said server.

9. The method of claim 6, wherein said packaging said worksheet grid form includes producing reports capable of summarizing information by selected groups.

10. The method of claim 6, wherein said packaging said worksheet grid form includes producing comparison reports on a delta between two similarly structured tables.

11. The method of claim 6, further including automatically maintaining a current level of implementation of said worksheet grid form on said client workstation.

* * * * *